(12) United States Patent
Mezawa et al.

(10) Patent No.: US 10,864,601 B2
(45) Date of Patent: Dec. 15, 2020

(54) MANUFACTURING MACHINE

(71) Applicant: DMG MORI CO., LTD., Yamatokoriyama (JP)

(72) Inventors: Yuhei Mezawa, Yamatokoriyama (JP); Takeshi Otawa, Yamatokoriyama (JP); Shigetsugu Sakai, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 330 days.

(21) Appl. No.: 15/735,693

(22) PCT Filed: Apr. 7, 2016

(86) PCT No.: PCT/JP2016/061391
§ 371 (c)(1),
(2) Date: Dec. 12, 2017

(87) PCT Pub. No.: WO2016/203823
PCT Pub. Date: Dec. 22, 2016

(65) Prior Publication Data
US 2019/0151990 A1    May 23, 2019

(30) Foreign Application Priority Data

Jun. 15, 2015    (JP) ................. 2015-119980

(51) Int. Cl.
*B23K 26/342*    (2014.01)
*B23K 26/08*    (2014.01)
(Continued)

(52) U.S. Cl.
CPC ........ *B23K 26/342* (2015.10); *B23K 26/0823* (2013.01); *B23K 26/0853* (2013.01);
(Continued)

(58) Field of Classification Search
CPC ......... B33Y 30/00; B33Y 40/00; B23P 23/04; B23Q 3/1556; B23K 26/21; B23K 26/34;
(Continued)

(56) References Cited

U.S. PATENT DOCUMENTS 5,837,960 A * 11/1998 Lewis .................... B23K 26/34
219/121.63
9,723,866 B2 * 8/2017 Lipson ................... B33Y 70/00
(Continued)

FOREIGN PATENT DOCUMENTS

CN    1660542 A    8/2005
CN    104768681 A    7/2015
(Continued)

OTHER PUBLICATIONS

International Search Report issued Jul. 12, 2016 in PCT/JP2016/061391 filed Apr. 7, 2016.

*Primary Examiner* — Paul R Durand
*Assistant Examiner* — Andrew P Bainbridge
(74) *Attorney, Agent, or Firm* — Oblon, McClelland, Maier & Neustadt, L.L.P.

(57) ABSTRACT

A manufacturing machine includes: a tool spindle configured to hold a tool for subtractive manufacturing for a workpiece; an additive manufacturing head detachably mounted on the tool spindle to discharge material powder and emit a laser beam during additive manufacturing; and a head stocker storing the additive manufacturing head in an outside-of-machining-area. The additive manufacturing head includes: a head body into which a laser beam is introduced; and a laser tool detachably mounted on the head body to emit the laser beam and define a laser-beam-irradiated region on the workpiece. The manufacturing machine further includes: a laser tool stocker storing a plurality of laser tools; and a laser tool exchanger for exchanging laser tools between the head body and the laser (Continued)

tool stocker. A high productivity of additive manufacturing is achieved by using the above features configured in this way.

11 Claims, 15 Drawing Sheets

(51) Int. Cl.
    *B23K 26/14*     (2014.01)
    *B33Y 30/00*     (2015.01)
    *B33Y 40/00*     (2020.01)
    *B23P 23/04*     (2006.01)
    *B23K 26/21*     (2014.01)
    *B23K 26/34*     (2014.01)
    *B23Q 3/155*     (2006.01)
    *B23K 26/70*     (2014.01)

(52) U.S. Cl.
    CPC ...... *B23K 26/0876* (2013.01); *B23K 26/1464* (2013.01); *B23K 26/1482* (2013.01); *B23K 26/21* (2015.10); *B23K 26/34* (2013.01); *B23K 26/702* (2015.10); *B23P 23/04* (2013.01); *B23Q 3/1556* (2013.01); *B33Y 30/00* (2014.12); *B33Y 40/00* (2014.12)

(58) Field of Classification Search
    CPC ............... B23K 26/342; B23K 26/702; B23K 26/0823; B23K 26/0853; B23K 26/0876; B23K 26/1464; B23K 26/1482
    USPC .................................................... 219/121.65
    See application file for complete search history.

(56) References Cited

U.S. PATENT DOCUMENTS

| | | | |
|---|---|---|---|
| 10,377,002 | B2 * | 8/2019 | Mori ..................... B23K 26/123 |
| 2005/0184032 | A1 * | 8/2005 | Yannazaki Tsunehiko ................. B23K 26/0604 219/121.6 |
| 2007/0271757 | A1 * | 11/2007 | Nagahama ......... B23K 26/0093 29/33 R |
| 2008/0053975 | A1 * | 3/2008 | Yamazaki .......... B23K 26/1482 219/121.78 |
| 2009/0095719 | A1 | 4/2009 | Tsukamoto et al. |
| 2009/0181838 | A1 * | 7/2009 | Schmauder ........ B23K 26/1482 483/16 |
| 2014/0099170 | A1 * | 4/2014 | Shin ...................... B23K 26/34 409/131 |
| 2015/0290741 | A1 | 10/2015 | Abe et al. |
| 2016/0221118 | A1 | 8/2016 | Yamashita et al. |
| 2016/0263706 | A1 * | 9/2016 | Potocki ................ B23K 26/361 |
| 2017/0136545 | A1 * | 5/2017 | Yoshimura ............ B33Y 10/00 |
| 2019/0275613 | A1 * | 9/2019 | Etter ...................... B23K 26/10 |

FOREIGN PATENT DOCUMENTS

| | | |
|---|---|---|
| JP | 9-314364 A | 12/1997 |
| JP | 2004-314168 A | 11/2004 |
| JP | 2004-322183 A | 11/2004 |
| JP | 2007-313515 A | 12/2007 |
| JP | 2009-90349 A | 4/2009 |
| JP | 2009-166126 A | 7/2009 |
| JP | 2012-206137 A | 10/2012 |
| JP | 2015-47621 A | 3/2015 |

* cited by examiner

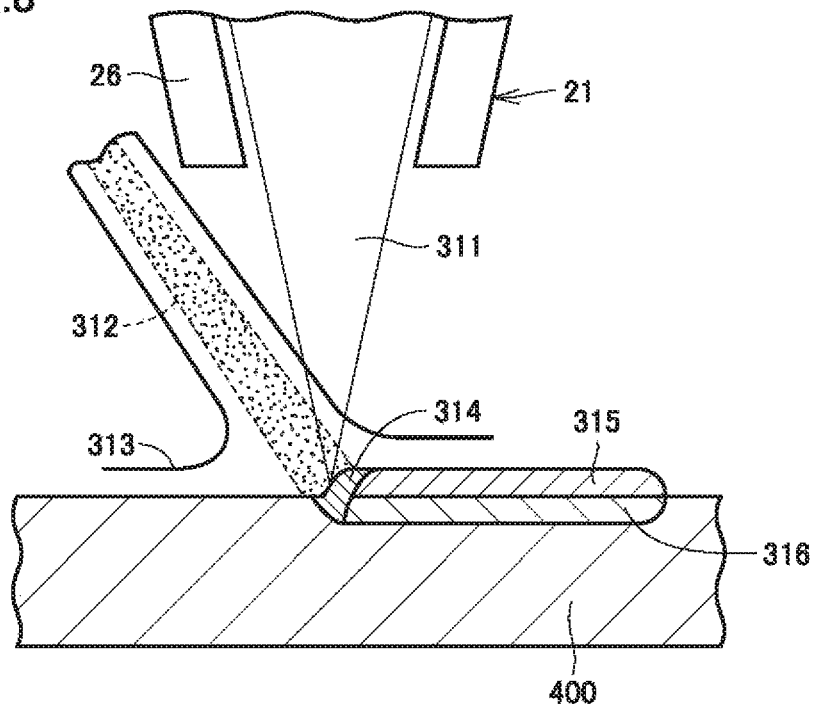
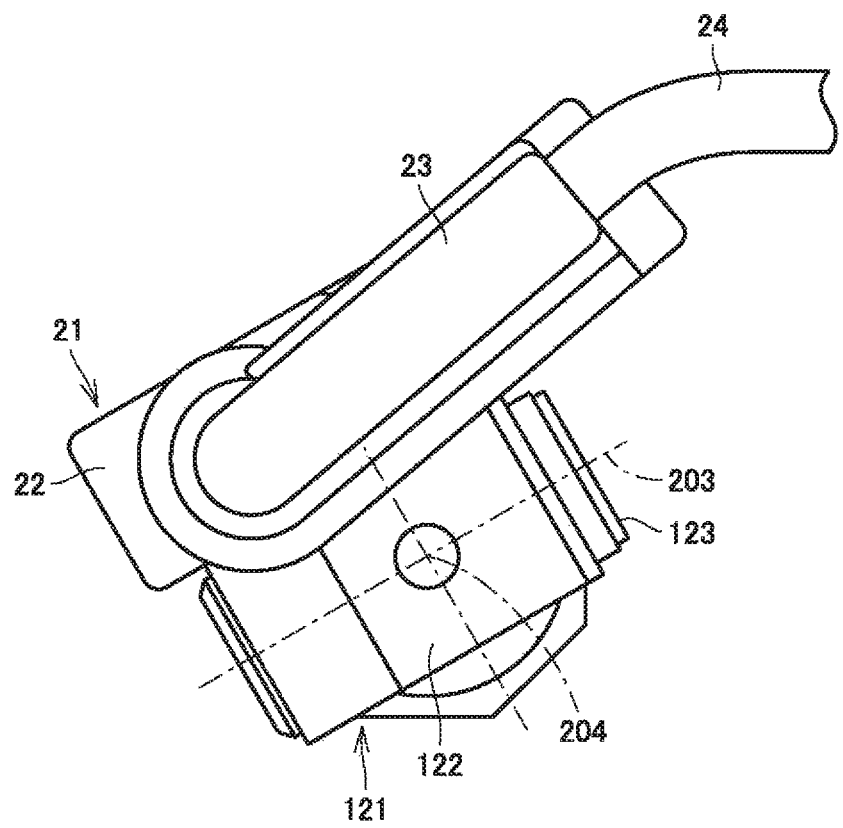

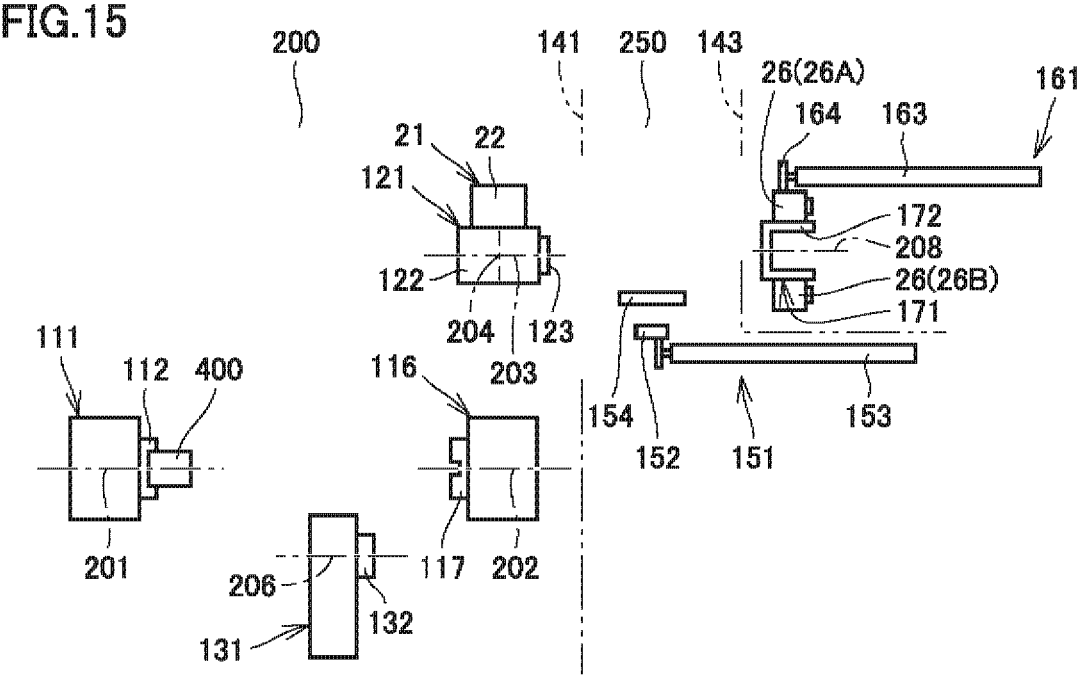
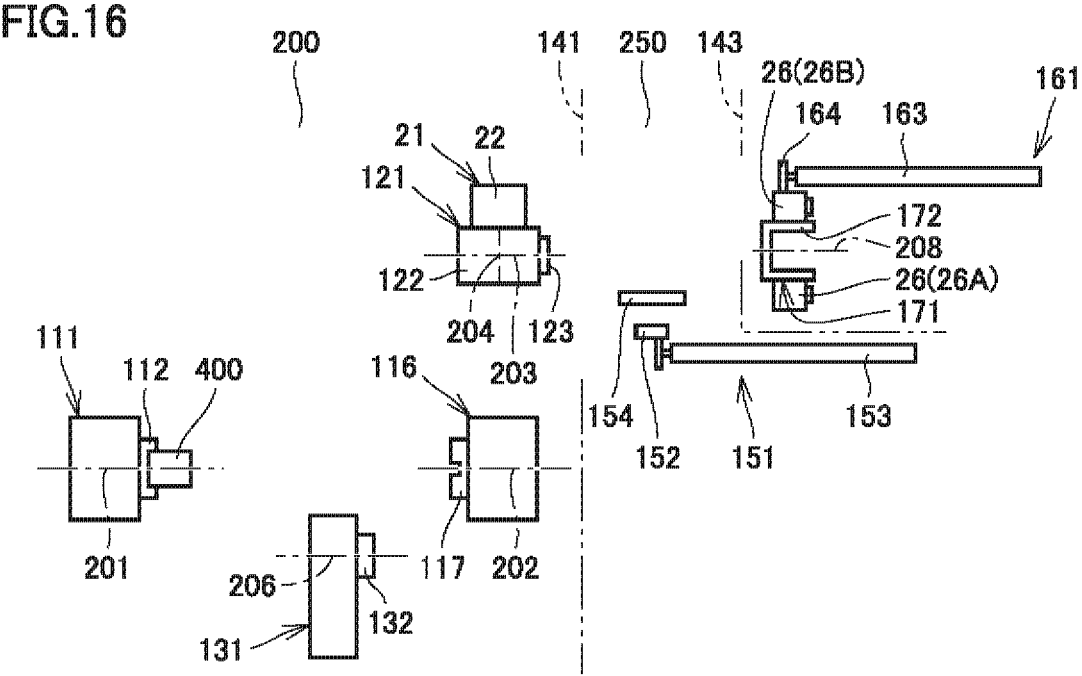

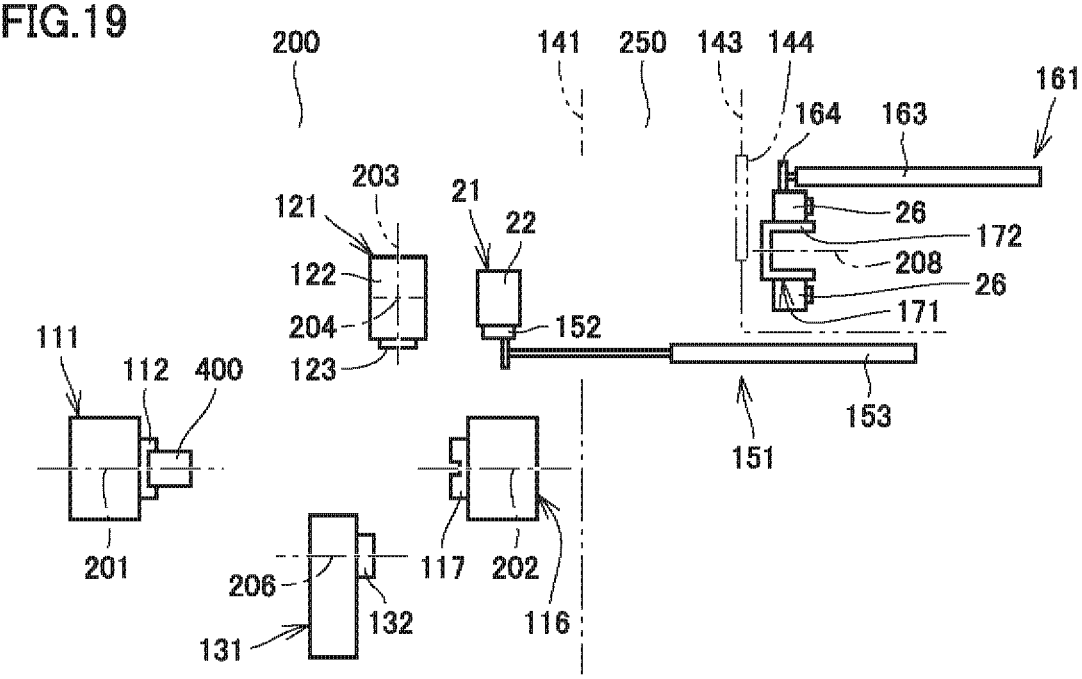
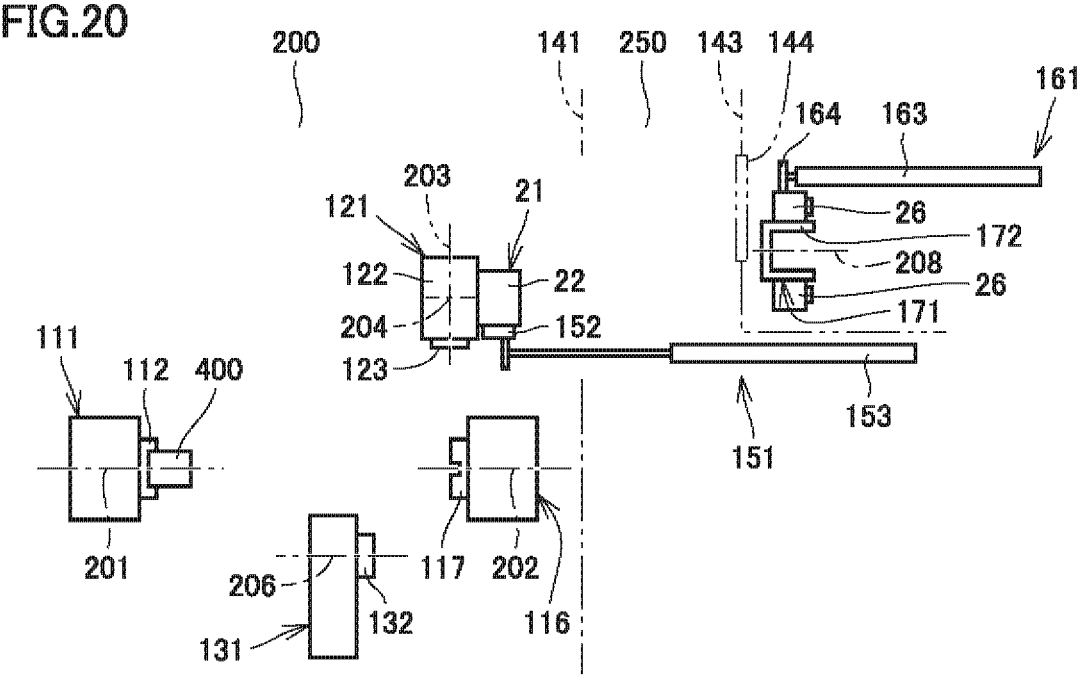

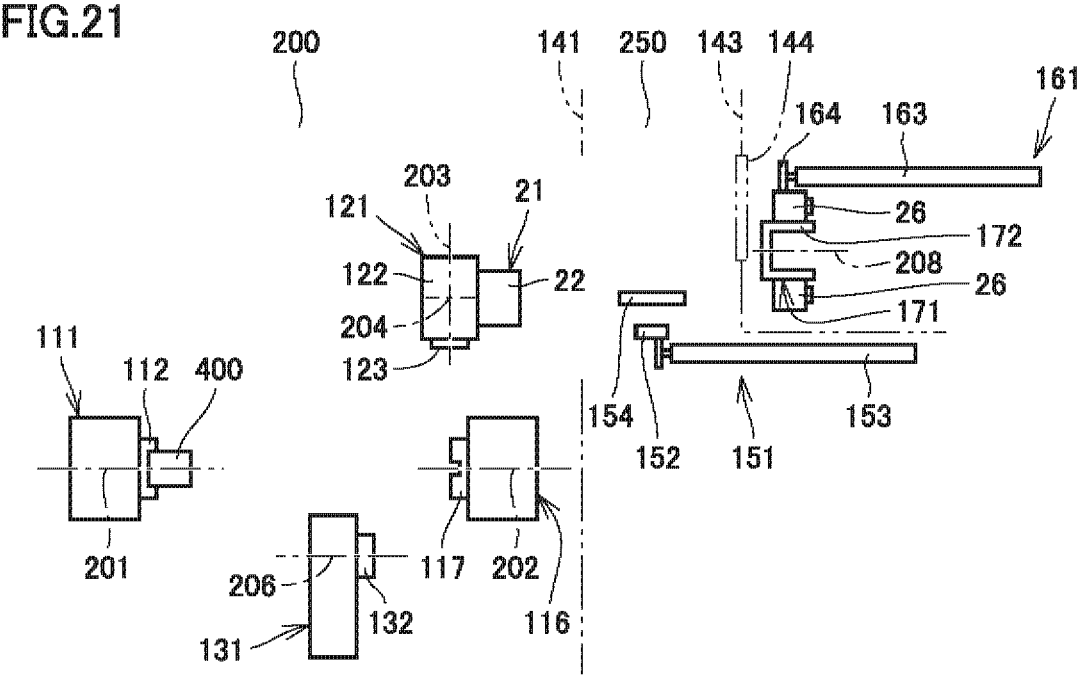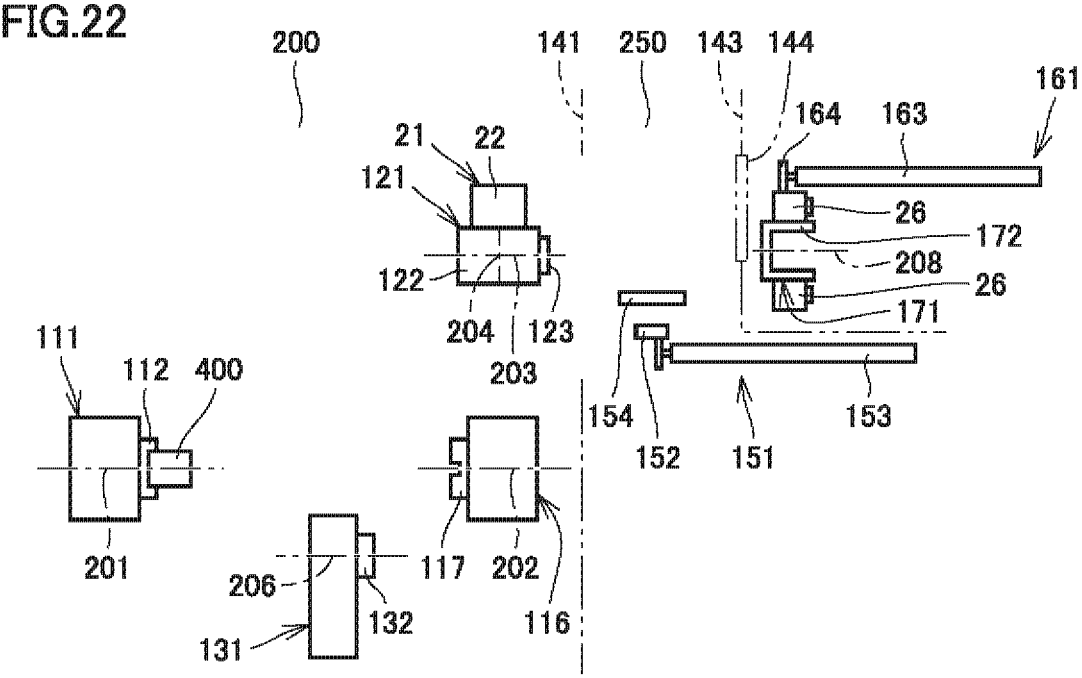

MANUFACTURING MACHINE

TECHNICAL FIELD

The present invention generally relates to manufacturing machines, and more particularly to a manufacturing machine capable of subtractive manufacturing and additive manufacturing for a workpiece.

BACKGROUND ART

Regarding conventional manufacturing machines, Japanese Patent Laying-Open No. 2004-314168 for example discloses a laser cladding apparatus for pump devices with the purpose of fast and accurate cladding without causing cracks in a base material (Patent Document 1). The laser cladding apparatus disclosed in Patent Document 1 includes a powder feeder feeding a metal material (powder) by means of argon gas as a carrier gas, a vortex-type powder feed nozzle uniformly mixing the fed metal material with the argon gas and simultaneously using a gas mixture of argon and nitrogen as a shield gas, and a multi-axis robot moving the vortex-type power feed nozzle.

Japanese Patent Laying-Open No. 2012-206137 discloses a repair apparatus with the purpose of easily performing cladding welding without human labor (Patent Document 2). The repair apparatus disclosed in Patent Document 2 includes a material feeding unit, a laser apparatus emitting a laser spot beam, and a welding robot having a multi-joint arm for moving the laser spot beam in three-dimensional directions.

CITATION LIST

Patent Document

PTD 1: Japanese Patent Laying-Open No. 2004-314168
PTD 2: Japanese Patent Laying-Open No. 2012-206137

SUMMARY OF INVENTION

Technical Problem

Additive manufacturing is a process of creating a three-dimensional shape by depositing materials onto a workpiece. In contrast, subtractive manufacturing is a process of creating a three-dimensional shape from a workpiece by removing materials from the workpiece. The mass of the workpiece has been increased after additive manufacturing, while the mass of the workpiece has been decreased after subtractive manufacturing. The additive and subtractive manufacturing processes are performed in combination in such a manner that takes respective advantages of these processes to produce the final shape of the workpiece.

Directed energy deposition is one of additive manufacturing processes. The directed energy deposition discharges material powder from an additive manufacturing head to a workpiece and also applies an energy beam from the additive manufacturing head to the workpiece. The shape and/or the size of the region irradiated with the energy beam appropriate for additive manufacturing, however, varies depending on additive manufacturing to be performed. If the additive manufacturing head is not equipped with means for changing the shape and/or the size of the region to be irradiated with the energy beam, the productivity of additive manufacturing is significantly deteriorated.

An object of the present invention is therefore to solve the above problem and provide a manufacturing machine excellent in productivity of additive manufacturing.

Solution to Problem

A manufacturing machine according to the present invention is capable of subtractive manufacturing and additive manufacturing for a workpiece. The manufacturing machine includes: a tool holder disposed movably in a machining area and configured to hold a tool to be used for subtractive manufacturing for a workpiece; an additive manufacturing head configured to be detachably mounted on the tool holder and to discharge material powder and emit an energy beam during additive manufacturing for a workpiece; and a head stocker configured to store the additive manufacturing head in an outside of the machining area. The additive manufacturing head includes: a body into which an energy beam is to be introduced; and an emission part configured to be detachably mounted on the body and to emit the energy beam and define an energy-beam-irradiated region that is a region irradiated with the energy beam on the workpiece. The manufacturing machine further includes: an emission part stocker disposed in the outside of the machining area and configured to store a plurality of emission parts that are different from each other in terms of the energy-beam-irradiated region defined on a workpiece; and an emission part exchanger configured to cause emission parts to be exchanged between the body and the emission part stocker.

Advantageous Effects of Invention

According to the present invention, a manufacturing machine excellent in productivity of additive manufacturing can be provided.

BRIEF DESCRIPTION OF DRAWINGS

FIG. 8 is an enlarged cross-sectional view of a surface of a workpiece during additive manufacturing.

FIG. 9 is a diagram for illustrating a range over which a tool spindle in FIG. 1 is swivelable.

FIG. 15 is a diagram schematically showing a third step of the laser tool exchange for additive manufacturing.

FIG. 16 is a diagram schematically showing a fourth step of the laser tool exchange for additive manufacturing.

FIG. 19 is a diagram schematically showing a second step of the attachment of the additive manufacturing head for transition from subtractive manufacturing to additive manufacturing.

FIG. 20 is a diagram schematically showing a third step of the attachment of the additive manufacturing head for transition from subtractive manufacturing to additive manufacturing.

FIG. 21 is a diagram schematically showing a fourth step of the attachment of the additive manufacturing head for transition from subtractive manufacturing to additive manufacturing.

FIG. 22 is a diagram schematically showing a fifth step of the attachment of the additive manufacturing head for transition from subtractive manufacturing to additive manufacturing.

DESCRIPTION OF EMBODIMENTS

Figure 1:
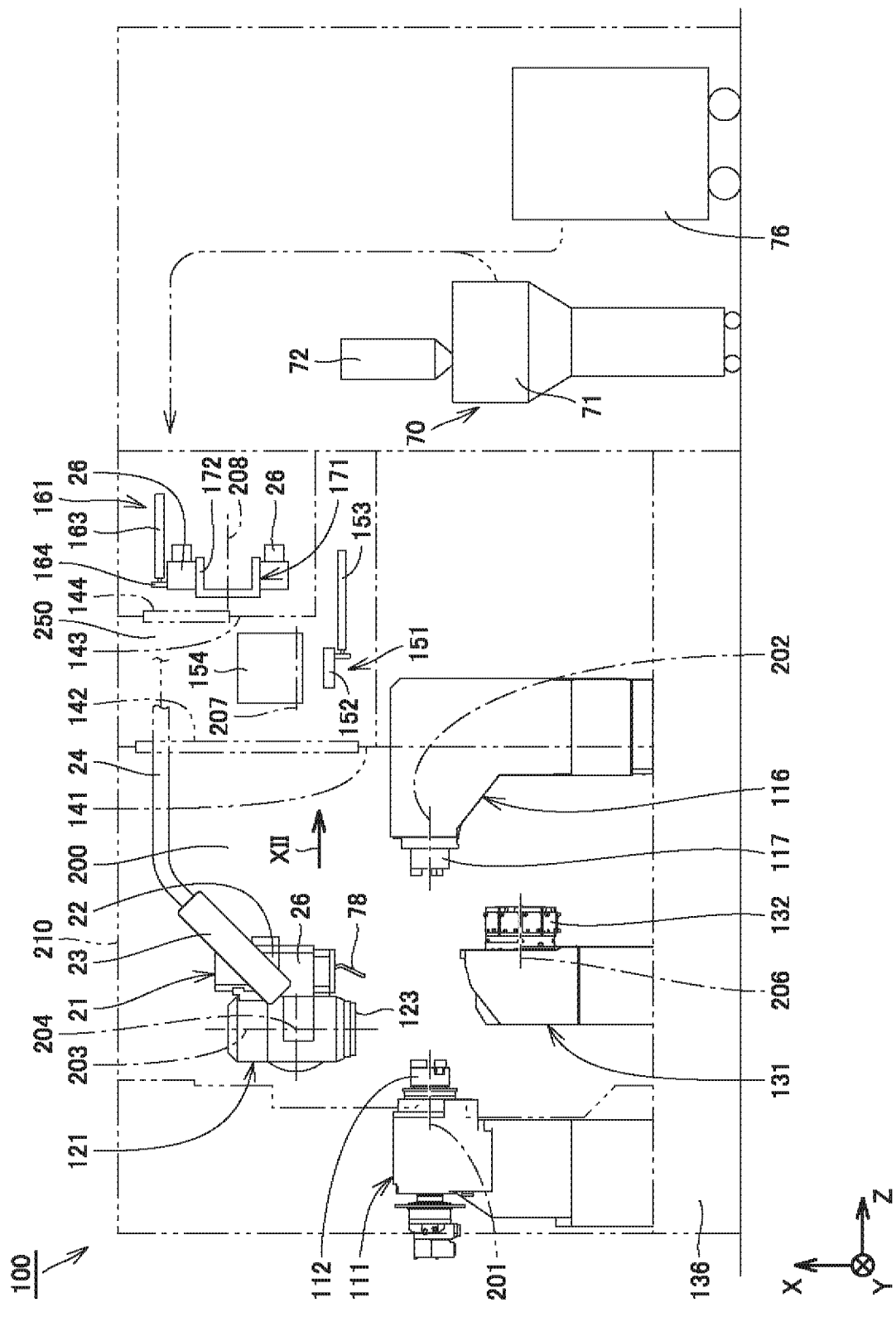
FIG. 1 is a front view showing a manufacturing machine in an embodiment of the present invention.

Embodiments of the present invention will be described with reference to the drawings. In the drawings referenced below, the same or corresponding members are denoted by the same numerals.

Figure 2:
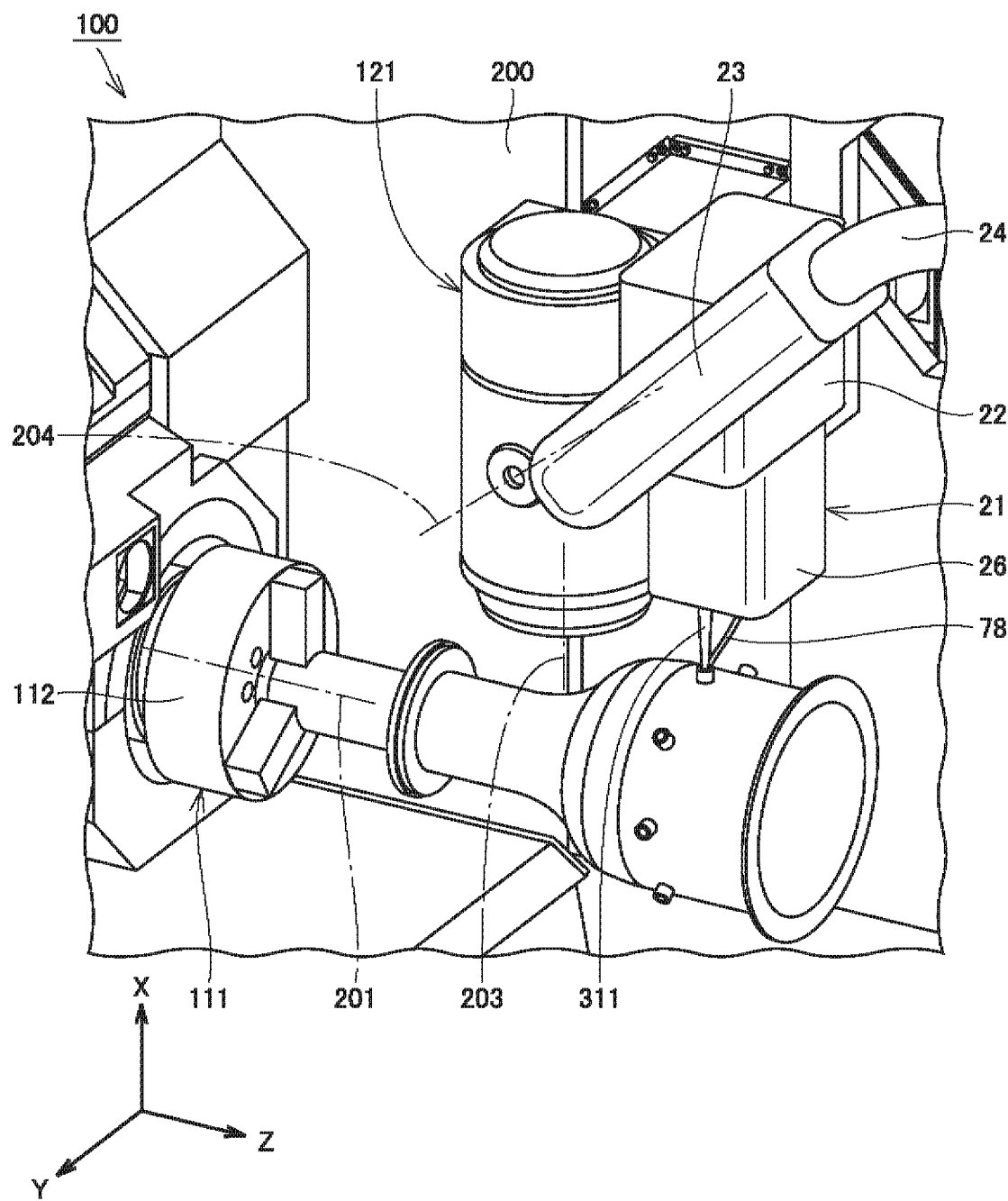
FIG. 2 is a perspective view showing the inside of a machining area during additive manufacturing in the manufacturing machine in FIG. 1.

FIG. 1 is a front view showing a manufacturing machine in an embodiment of the present invention. In FIG. 1, a cover body presenting the appearance of the manufacturing machine is shown as if it is transparent, so that the inside of the manufacturing machine is visible. FIG. 2 is a perspective view showing the inside of a machining area during additive manufacturing in the manufacturing machine in FIG. 1.

Referring to FIGS. 1 and 2, manufacturing machine 100 is an AM/SM hybrid manufacturing machine capable of additive manufacturing (AM) for a workpiece and subtractive manufacturing (SM) for a workpiece. Manufacturing machine 100 has a turning function performed by means of a stationary tool and a milling function performed by means of a rotary tool, as functions of SM.

First, a description is given of the overall structure of manufacturing machine 100. Manufacturing machine 100 includes a bed 136, a first headstock 111, a second headstock 116, a tool spindle 121, and a lower tool rest 131.

Bed 136 is a base member for supporting first headstock 111, second headstock 116, tool spindle 121, and lower tool rest 131, and mounted on an installation surface in a factory or the like. First headstock 111, second headstock 116, tool spindle 121, and lower tool rest 131 are disposed in a machining area 200 defined by a splashguard 210.

First headstock 111 and second headstock 116 are provided to face each other in the direction of a Z-axis that extends horizontally. First headstock 111 and second headstock 116 have a first spindle 112 and a second spindle 117, respectively, for rotating a workpiece in a turning process performed by means of a stationary tool. First spindle 112 is provided rotatably about a central axis 201 extending in parallel with the Z axis. Second spindle 117 is provided rotatably about a central axis 202 extending in parallel with the Z axis. First spindle 112 and second spindle 117 are each provided with a chuck mechanism for detachably holding a workpiece.

Second headstock 116 is provided to be movable in the Z-axis direction by any of various feed mechanisms, guide mechanisms, a servo motor, and the like.

Tool spindle (upper tool rest) 121 causes a rotary tool to rotate in a milling process performed by means of the rotary tool. Tool spindle 121 is provided rotatably about a central axis 203 extending in parallel with an X axis that extends vertically. Tool spindle 121 is provided with a clamp mechanism for detachably holding the rotary tool.

Tool spindle 121 is supported above bed 136 through a column or the like (not shown). Tool spindle 121 is provided to be movable, by any of various feed mechanisms, guide mechanisms, a servo motor, and the like provided on the column or the like, in the X-axis direction, the direction of a Y axis extending horizontally and orthogonally to the Z axis, and the Z-axis direction. The position of machining by the rotary tool attached to tool spindle 121 moves three-dimensionally. Further, tool spindle 121 is provided to be swivelable about a central axis 204 extending in parallel with the Y axis.

Although not shown in FIG. 1, an automatic tool-change device for automatically changing a tool attached to tool spindle 121 and a tool magazine storing replacement tools to be attached to tool spindle 121 are provided around first headstock 111.

To lower tool rest 131, a plurality of stationary tools for turning are attached. Lower tool rest 131 has a so-called turret shape, and a plurality of stationary tools are attached radially to lower tool rest 131. Lower tool rest 131 is provided for swivel indexing.

More specifically, lower tool rest 131 includes a swivel unit 132. Swivel unit 132 is provided to be swivelable about a central axis 206 extending in parallel with the Z axis. At positions located at intervals in the direction of the circumference centered at central axis 206, tool holders for holding stationary tools are attached. Swivel unit 132 swivels about central axis 206 to thereby circumferentially move the stationary tools held by the tool holders, and a stationary tool to be used for turning is indexed.

Lower tool rest 131 is supported above bed 136 through a saddle or the like (not shown). Lower tool rest 131 is provided to be movable in the X-axis direction and the Z-axis direction by any of various feed mechanisms, guide mechanisms, a servo motor, and the like provided on the saddle or the like.

Manufacturing machine 100 further includes an additive manufacturing head 21. Additive manufacturing head 21 performs additive manufacturing by discharging material powder toward a workpiece and emitting an energy beam toward the workpiece (Directed Energy Deposition). Typical examples of the energy beam are laser beam and electron beam. In the present embodiment, a laser beam is used for additive manufacturing.

Additive manufacturing head 21 includes a head body (main body) 22, a laser tool (emission part) 26, and a cable joint 23.

A laser beam and material powder are introduced into head body 22. Laser tool 26 is configured to emit a laser beam toward a workpiece and define a laser-beam-irradiated region that is a region irradiated with the laser beam on the workpiece. Laser tool 26 is mounted detachably on head body 22 (detailed later herein). Cable joint 23 is provided as a joint for connecting a cable 24 described later herein to head body 22.

Manufacturing machine 100 further includes a material powder feeder 70, a laser oscillator 76, and a cable 24.

Material powder feeder 70 feeds material powder to be used for additive manufacturing toward additive manufacturing head 21. Material powder feeder 70 includes a material powder tank 72 for storing material powder to be used for additive manufacturing, and a mixing unit 71 for mixing the material powder with carrier gas. Laser oscillator 76 generates a laser beam to be used for additive manufacturing.

Cable 24 includes an optical fiber for directing the laser beam from laser oscillator 76 toward additive manufacturing head 21, a pipe for directing the material powder from material powder feeder 70 toward additive manufacturing head 21, and a tube member that houses the optical fiber and the pipe.

Figure 3:
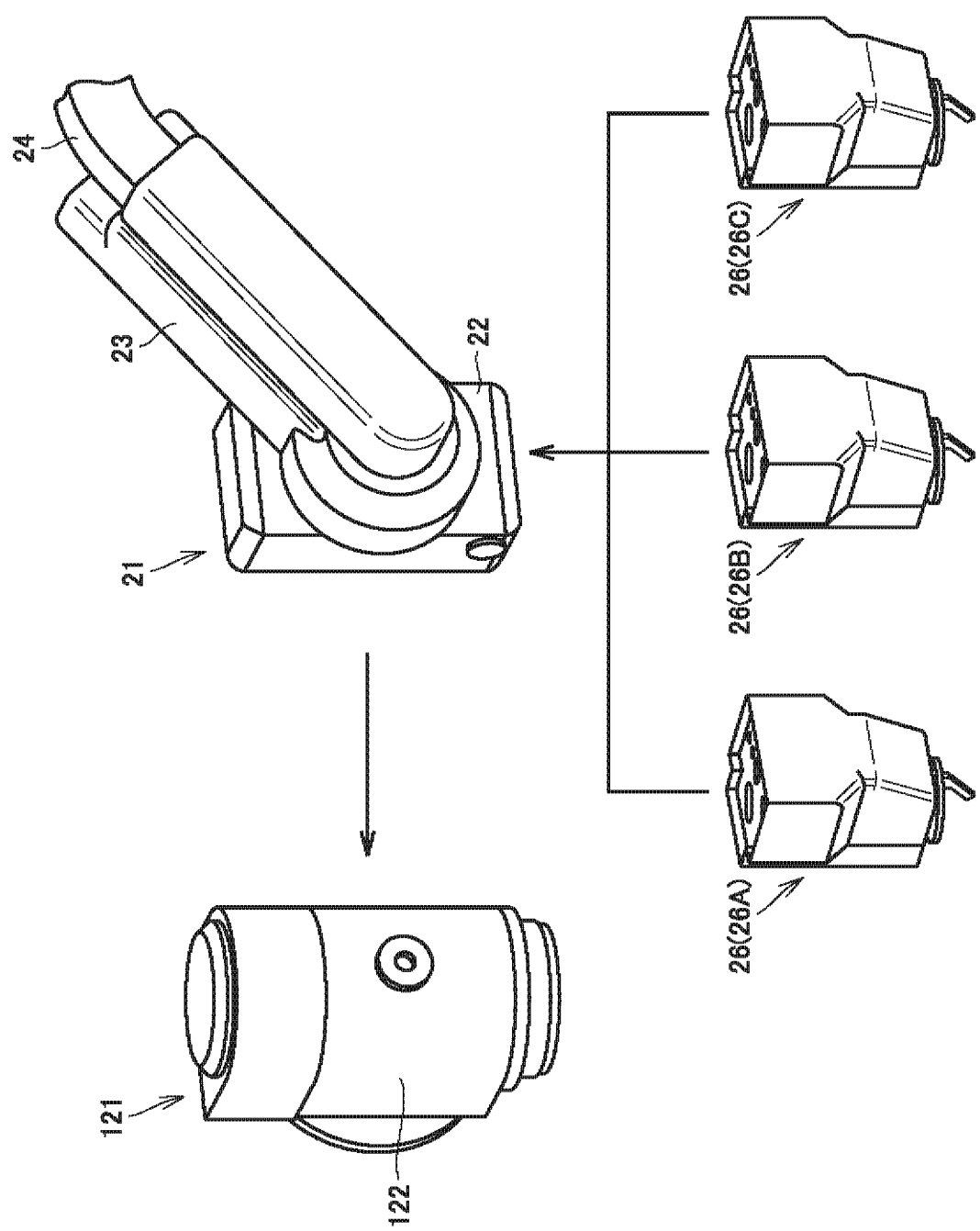
FIG. 3 is a diagram showing how an additive manufacturing head is attached to a tool spindle.

FIG. 3 is a diagram showing how an additive manufacturing head is attached to a tool spindle. Referring to FIGS. 1 to 3, additive manufacturing head 21 is mounted detachably on tool spindle 121. Head body 22 of additive manufacturing head 21 is mounted detachably on tool spindle 121.

When additive manufacturing is to be performed, additive manufacturing head 21 is attached to tool spindle 121. As tool spindle 121 moves in the X-axis direction, the Y-axis direction, and the Z-axis direction, the position where additive manufacturing is performed by additive manufacturing head 21 is displaced three-dimensionally. When subtractive manufacturing is to be performed, additive manufacturing head 21 is detached from tool spindle 121 and stored at a head stocker 151 described later herein.

Tool spindle 121 is provided with a clamp mechanism. When additive manufacturing head 21 is to be attached to tool spindle 121, the clamp mechanism operates to couple additive manufacturing head 21 to tool spindle 121. An example of the clamp mechanism may be a mechanism that uses a spring force to obtain a clamped state and uses a hydraulic pressure to obtain an unclamped state.

Figure 12:
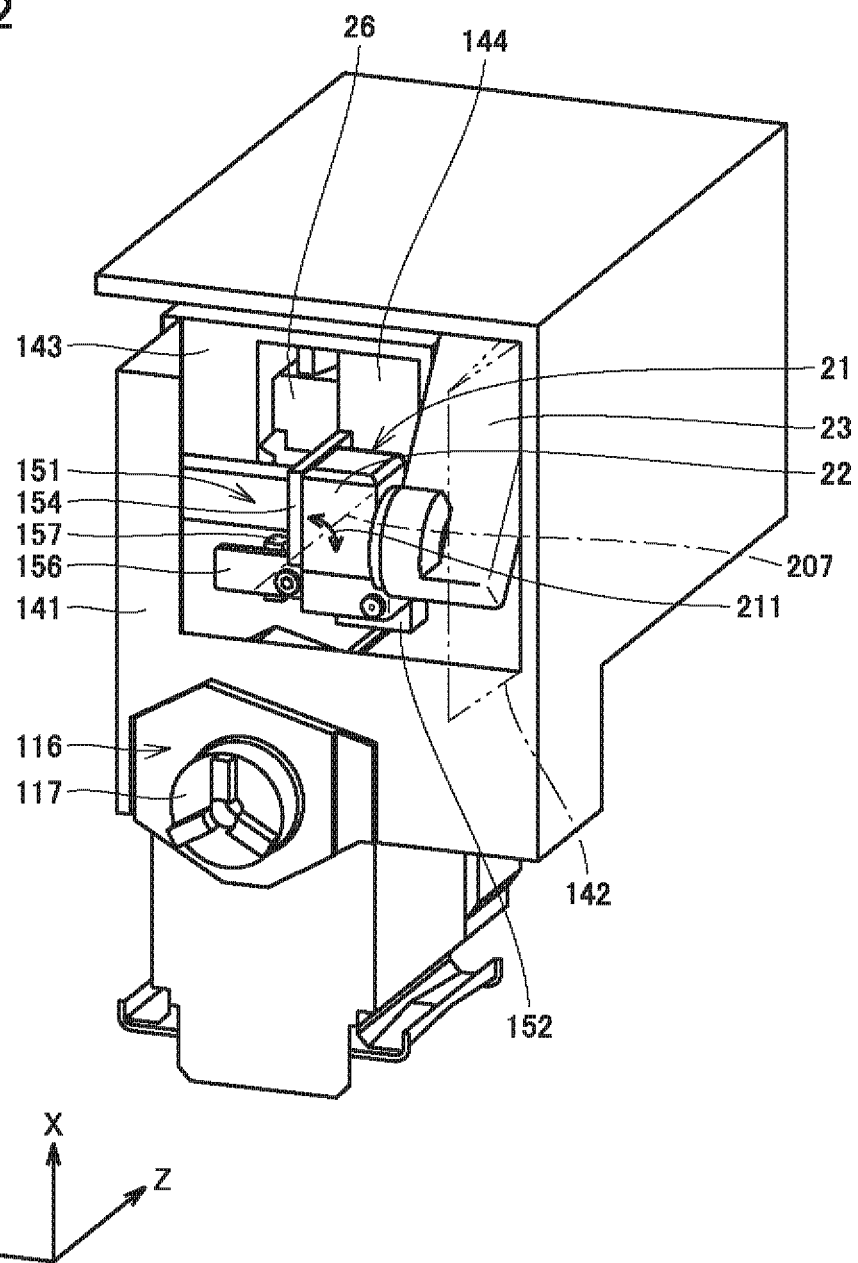
FIG. 12 is a perspective view showing the manufacturing machine as seen in the direction indicated by an arrow XII in FIG. 1.

Tool spindle 121 includes an attachment cover 156 (not shown in FIGS. 1 to 3, see FIG. 12). Attachment cover 156 is mounted detachably on tool spindle 121.

When subtractive manufacturing is to be performed, attachment cover 156 is attached to tool spindle 121, instead of additive manufacturing head 21. Attachment cover 156 is disposed to cover a part of tool spindle 121 to which additive manufacturing head 21 is to be attached. In this way, coolant, mist, and chips that are generated during subtractive manufacturing are prevented from attaching to the part of tool spindle 121 to which additive manufacturing head 21 is to be attached. When additive manufacturing is to be performed, attachment cover 156 is separated from tool spindle 121 and stored at head stocker 151 described later herein.

Subsequently, the structure of additive manufacturing head 21 in FIG. 1 is described in more detail.

Figure 4:
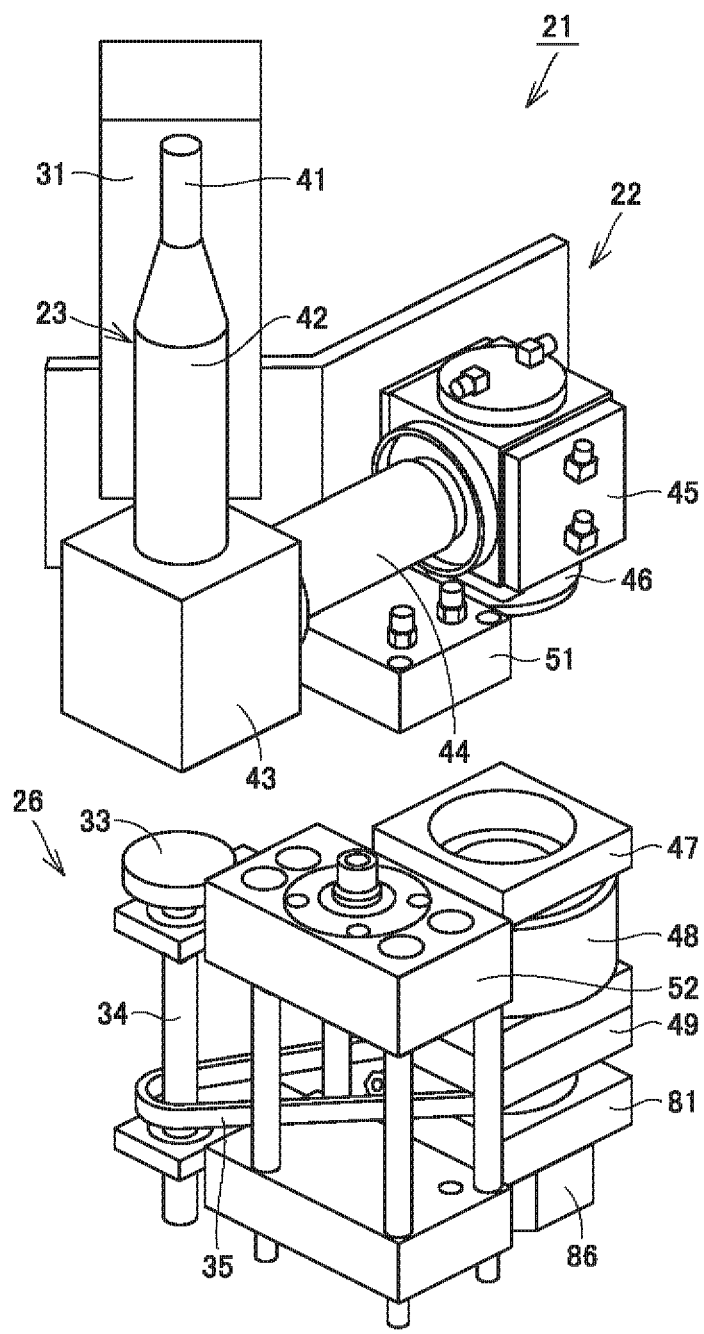
FIG. 4 is a perspective view showing an internal structure of an additive manufacturing head in FIG. 1.
Figure 5:
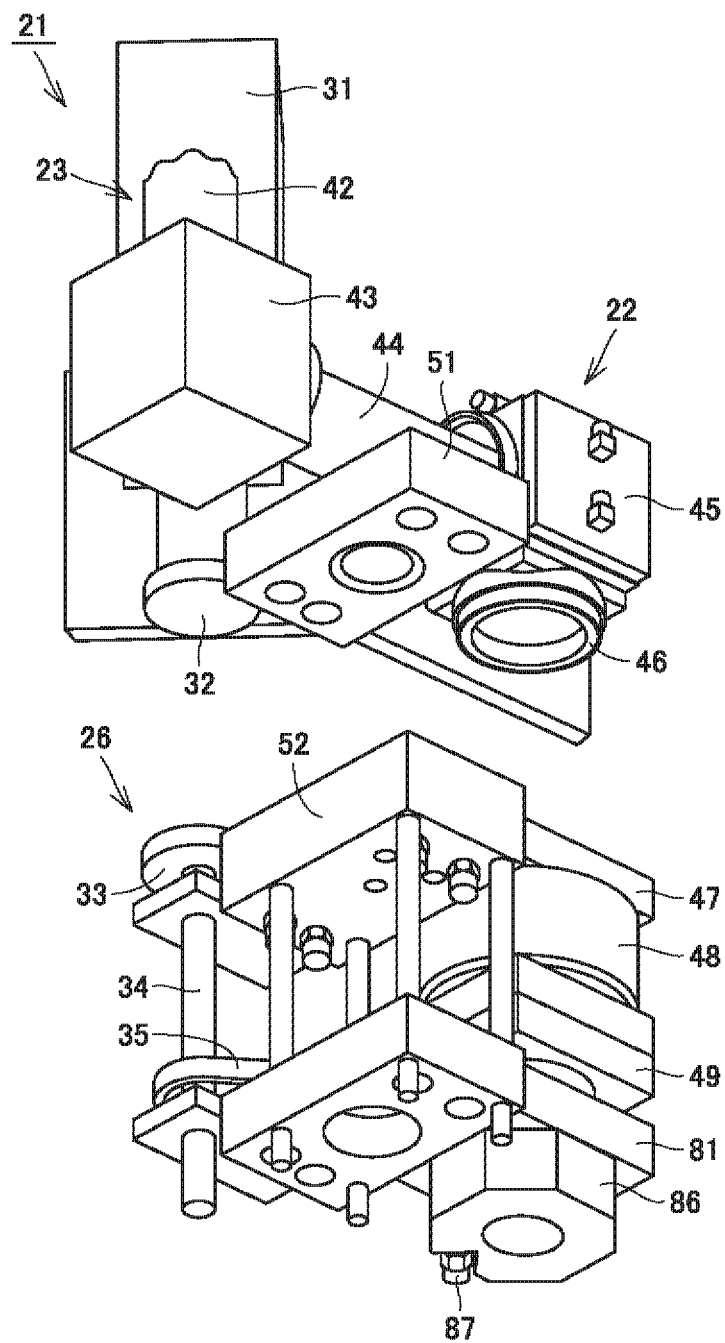
FIG. 5 is another perspective view showing the internal structure of the additive manufacturing head in FIG. 1.

FIG. 4 is a perspective view showing an internal structure of the additive manufacturing head in FIG. 1. FIG. 5 is another perspective view showing the internal structure of the additive manufacturing head in FIG. 1. In the drawings, the state where later tool 26 is separated from head body 22 is shown.

Referring to FIGS. 4 and 5, a coupling mechanism for head body 22 and laser tool 26 is described first. Head body 22 and laser tool 26 include a coupling part 51 and a coupling part 52, respectively. Coupling part 51 and coupling part 52 each contain a clamp mechanism. When laser tool 26 is to be attached to head body 22, the clamp mechanisms operate to connect coupling part 51 and coupling part 52 to each other. An example of the clamp mechanism may be a mechanism that uses a spring force to obtain a clamped state and uses a hydraulic pressure to obtain an unclampled state.

Next, a mechanism provided in additive manufacturing head 21 for applying a laser beam to a workpiece is described. Cable joint 23 and head body 22 include an optical fiber 41, a laser beam inlet tube 42, a laser beam passage casing 43, a laser beam passage tube 44, and a laser beam passage casing 45.

A laser beam is directed from cable 24 to optical fiber 41. Optical fiber 41 is connected to laser beam inlet tube 42. Laser beam inlet tube 42, laser beam passage casing 43, laser beam passage tube 44, and laser beam passage casing 45 are consecutively arranged in this order. Laser beam inlet tube 42, laser beam passage casing 43, laser beam passage tube 44, and laser beam passage casing 45 form a passage for a laser beam in head body 22.

Laser tool 26 includes a laser beam passage casing 48 and a laser beam emission casing 49. Laser beam passage casing 48 and laser beam emission casing 49 are consecutively arranged. Laser beam passage casing 48 and laser beam emission casing 49 form a passage for a laser beam in laser tool 26.

Head body 22 and laser tool 26 include a connecting part 46 and a connecting part 47, respectively. When laser tool 26 is to be attached to head body 22, connecting part 47 is connected to connecting part 46 to thereby allow communication between head body 22 and laser tool 26 for passage of a laser beam.

Figure 6:
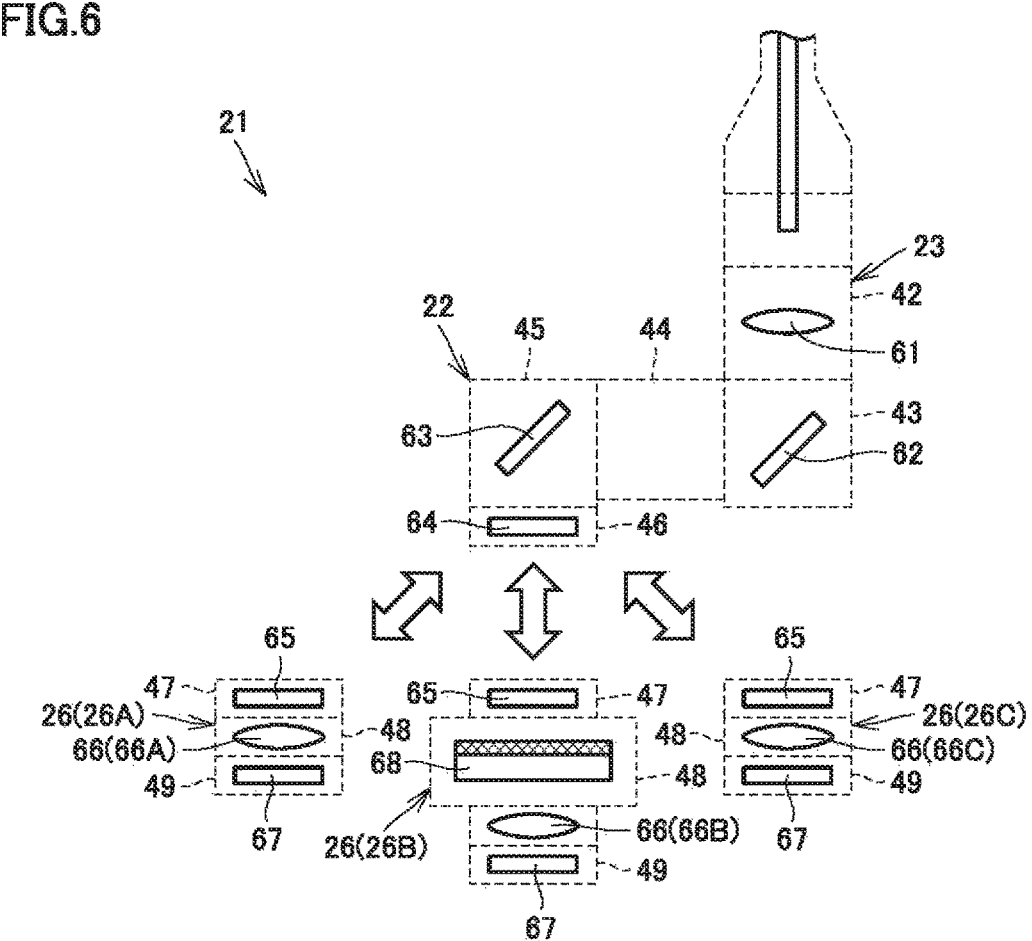
FIG. 6 is a diagram schematically showing an optical system for the additive manufacturing head in FIG. 1.

FIG. 6 is a diagram schematically showing an optical system for the additive manufacturing head in FIG. 1. Referring to FIGS. 4 to 6, cable joint 23 and head body 22 include a collimation lens 61, a reflection mirror 62, a reflection mirror 63, and a protective glass 64.

Collimation lens 61 is housed in laser beam inlet tube 42. Collimation lens 61 collimates a laser beam entering from optical fiber 41 into parallel light and directs the light toward reflection mirror 62 and reflection mirror 63. Reflection mirror 62 and reflection mirror 63 are housed in laser beam passage casing 43 and laser beam passage casing 45, respectively. Reflection mirror 62 and reflection mirror 63 reflect the laser beam from collimation lens 61 to direct the laser beam toward laser tool 26.

Protective glass 64 is disposed in connecting part 46. Protective glass 64 is provided for protecting optical elements contained in head body 22 against the external ambient.

Laser tool 26 includes a protective glass 65, a condenser lens 66, and a protective glass 67. Condenser lens 66 is housed in laser beam passage casing 48. Condenser lens 66 is a lens for concentrating the laser beam onto a workpiece and provided as an optical element defining a laser-beam-irradiated region on the workpiece. The optical element defining a laser-beam-irradiated region on a workpiece is not limited to condenser lens 66, and may be a mirror, for example.

Protective glass 65 and protective glass 67 are disposed in connecting part 47 and laser beam emission casing 49, respectively. Protective glass 65 and protective glass 67 are disposed for protecting the optical elements contained in laser tool 26 against the external ambient.

To head body 22, a laser tool 26 that is any one of a plurality of laser tools 26 (laser tool 26A, laser tool 26B, and laser tool 26C in FIG. 6) is selectively attached, depending on conditions for additive manufacturing to be performed. The plurality of laser tools 26 differ from each other in terms of the shape and the size of the laser-beam-irradiated region defined on a workpiece.

With reference to the example shown in FIG. 6, laser tool 26A includes a condenser lens 66A and uses this condenser lens 66A to define a circular irradiated region with a diameter of 2 mm on a workpiece. Laser tool 26B includes a homogenizer 68 and a condenser lens 66B and uses homogenizer 68 and condenser lens 66B to define a rectangular irradiated region of 3 mm×8 mm on a workpiece. Laser tool 26C includes a condenser lens 66C and uses condenser lens 66C to define a circular irradiated region with a diameter of 4 mm on a workpiece.

Figure 7:
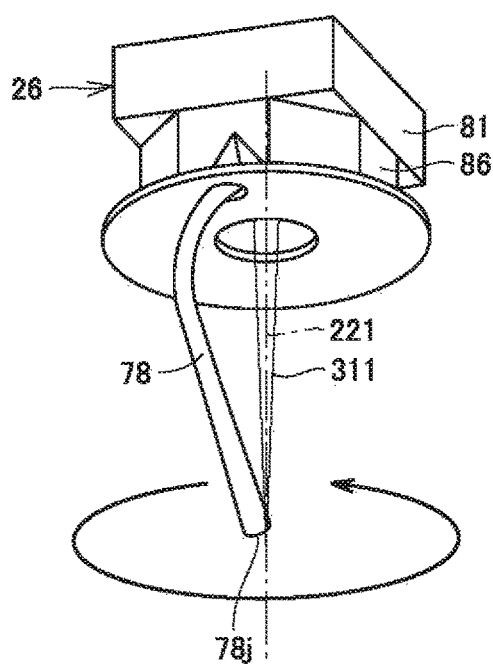
FIG. 7 is a perspective view showing a leading end of the additive manufacturing head in FIG. 1.

FIG. 7 is a perspective view showing a leading end of the additive manufacturing head in FIG. 1. Referring to FIGS. 4 to 7, a mechanism in additive manufacturing head 21 for discharging material powder toward a workpiece is described. Laser tool 26 includes a stationary member 81, a rotary member 86, and a nozzle 78 (nozzle 78 is not shown in FIGS. 4 and 5).

Stationary member 81 is disposed to be adjacent to laser beam emission casing 49. Stationary member 81 is disposed opposite to laser beam passage casing 48 with respect to laser beam emission casing 49. Stationary member 81 is secured to other members that form laser tool 26.

Rotary member 86 is disposed to be rotatable about a central axis 221 (see FIG. 7). Central axis 221 extends in the direction along an optical axis of a laser beam 311 emitted from laser tool 26 toward a workpiece. In the present embodiment, central axis 221 coincides with the optical axis of laser beam 311. Rotary member 86 is disposed directly beside stationary member 81 in the axial direction of central axis 221. In other words, rotary member 86 and stationary member 81 are arranged side by side in the axial direction of central axis 221.

Nozzle 78 discharges material powder toward a workpiece. Nozzle 78 is connected to rotary member 86 through a pipe joint 87 (see FIG. 5). The material powder introduced from cable 24 in FIG. 1 into additive manufacturing head 21 is fed to nozzle 78 through stationary member 81 and rotary member 86.

Nozzle 78 extends from rotary member 86 in the direction in which laser beam 311 is emitted. Nozzle 78 is positioned radially away from central axis 221 (optical axis of laser beam 311). At the leading end of nozzle 78 extending from rotary member 86, nozzle 78 has a discharge outlet 78j from which material powder is discharged. Discharge outlet 78j has its opening positioned radially away from central axis 221 (optical axis of laser beam 311). The opening of discharge outlet 78j faces a region (spot) to be irradiated with laser beam 311 that is to be formed on a workpiece.

As rotary member 86 is rotated about central axis 221, nozzle 78 is moved in the circumferential direction about laser beam 311 emitted toward a workpiece. Particularly in the present embodiment, central axis 221 about which rotary member 86 rotates coincides with the optical axis of laser beam 311, and therefore, nozzle 78 revolves about the optical axis of laser beam 311.

Head body 22 includes a servo motor 31 serving as a rotary drive source, and a clutch plate 32. Laser tool 26 includes a clutch plate 33, a rotary shaft 34, and a pulley belt 35.

Clutch plate 32 is connected to an output shaft of servo motor 31. Rotary shaft 34 is connected to clutch plate 33. When laser tool 26 is attached to head body 22, frictional engagement between clutch plate 33 and clutch plate 32 causes rotation that is output from servo motor 31 to be transmitted to rotary shaft 34. Pulley belt 35 is wrapped around pulleys (not shown) disposed on rotary shaft 34 and rotary member 86. Rotation of rotary shaft 34 is transmitted through pulley belt 35 to rotary member 86 to cause rotary member 86 to rotate about central axis 221.

In additive manufacturing head 21 in the present embodiment, servo motor 31 is controlled to drive nozzle 78 for revolving nozzle 78 so that the direction in which material powder is discharged from nozzle 78 toward a workpiece is constant, relative to the direction in which additive manufacturing head 21 is moved relative to the workpiece.

FIG. 8 is an enlarged cross-sectional view of a surface of a workpiece during additive manufacturing. Referring to FIGS. 2 and 8, during additive manufacturing, tool spindle 121 to which additive manufacturing head 21 is attached is moved and/or first spindle 112 of first headstock 111 holding a workpiece 400 is rotated to cause additive manufacturing head 21 and workpiece 400 to move relative to each other while keeping laser tool 26 facing workpiece 400. At this time, laser beam 311, material powder 312, and shield-and-carrier gas 313 are discharged from additive manufacturing head 21 (laser tool 26) toward workpiece 400. Accordingly, a melt spot 314 is formed in the surface of workpiece 400 and consequently material powder 312 is melted and deposited.

Specifically, a cladding layer 316 is formed in the surface of workpiece 400. On cladding layer 316, a cladding material 315 is deposited. Cladding material 315 is cooled into a machinable layer formed on the surface of workpiece 400. As the material powder, metal powder of aluminum alloy, magnesium alloy, or the like, or ceramic powder may be used.

FIG. 9 is a diagram for illustrating a range over which a tool spindle in FIG. 1 is swivelable. Referring to FIG. 9, tool spindle 121 is provided to be swivelable about central axis 204. The range over which tool spindle 121 is swivelable is a range of ±120° with respect to the posture (posture shown in FIG. 1) of tool spindle 121 in which a spindle end face 123 of tool spindle 121 is oriented downward. In FIG. 9, tool spindle 121 swiveled by an angle of +120° from the posture in FIG. 1 is shown. The range over which tool spindle 121 is swivelable is preferably a range of ±90° or more with respect to the posture shown in FIG. 1.

During additive manufacturing in which additive manufacturing head 21 is attached to tool spindle 121, swiveling of tool spindle 121 causes additive manufacturing head 21 to also swivel together with tool spindle 121. In this way, the direction in which additive manufacturing is performed by additive manufacturing head 21 (the direction in which a laser beam is applied toward a workpiece) can be changed freely.

Figure 10:
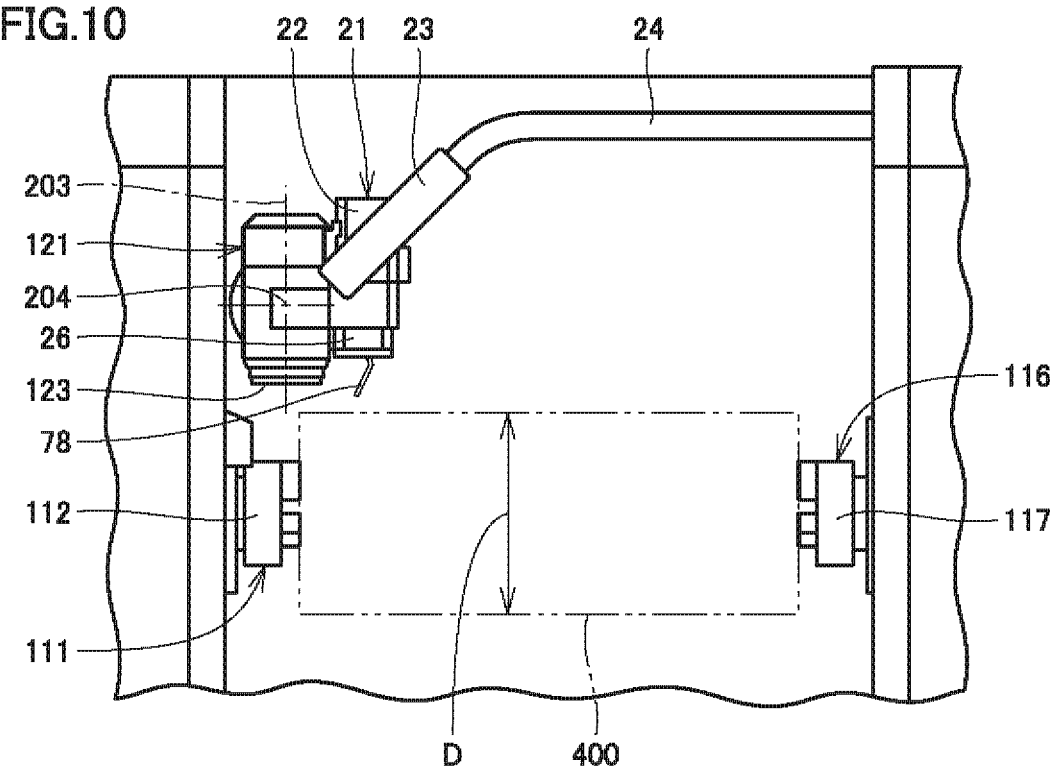
FIG. 10 is a front view showing an example of the maximum diameter of a workpiece that can be subjected to additive manufacturing in the manufacturing machine in FIG. 1.
Figure 11:
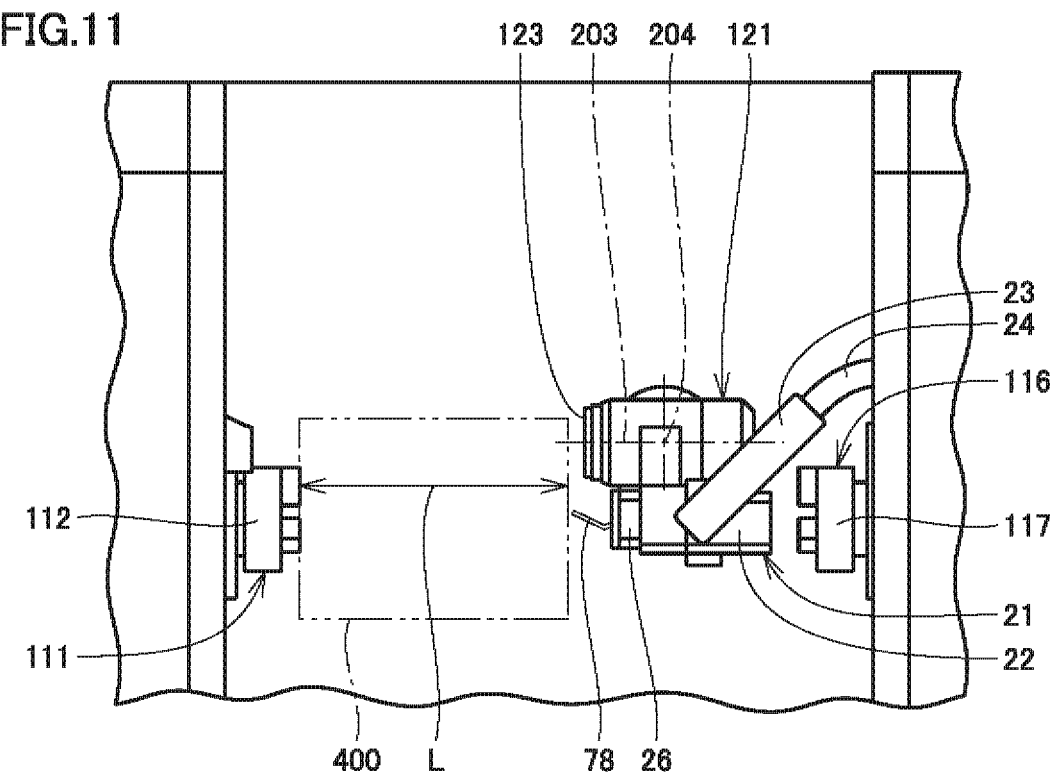
FIG. 11 is a front view showing an example of the maximum length of a workpiece that can be subjected to additive manufacturing in the manufacturing machine in FIG. 1.

FIG. 10 is a front view showing an example of the maximum diameter of a workpiece that can be subjected to additive manufacturing in the manufacturing machine in FIG. 1. FIG. 11 is a front view showing an example of the maximum length of a workpiece that can be subjected to additive manufacturing in the manufacturing machine in FIG. 1.

Referring to FIGS. 9 to 11, tool spindle 121 includes a cylindrical portion 122. Cylindrical portion 122 is a case body presenting the appearance of tool spindle 121. Cylindrical portion 122 extends in a cylindrical shape along central axis 203 and connects to spindle end face 123 at its end.

Additive manufacturing head 21 is detachably mounted on cylindrical portion 122 of tool spindle 121 (namely on the lateral surface of tool spindle 121). Additive manufacturing head 21 mounted on cylindrical portion 122 is positioned radially away from central axis 203.

In such a configuration, the length of a portion of additive manufacturing head 21 that protrudes from spindle end face 123 of tool spindle 121 is short, and accordingly, the dimension of a workpiece that can be subjected to additive manufacturing can be set larger.

For example, in FIG. 10, additive manufacturing is to be performed on the outer circumferential surface of workpiece 400. At this time, additive manufacturing head 21 scans workpiece 400 with additive manufacturing head 21 facing the outer circumferential surface of workpiece 400. Tool spindle 121 is therefore held in a posture in which spindle end face 123 is oriented downward. In the present embodiment, the length of a portion of additive manufacturing head 21 that protrudes from spindle end face 123 of tool spindle 121 is short, and accordingly, maximum diameter D of workpiece 400 that can be subjected to additive manufacturing can be set larger.

In FIG. 11, additive manufacturing is to be performed on an end face of workpiece 400 mounted on first headstock 111. At this time, additive manufacturing head 21 scans workpiece 400 with additive manufacturing head 21 facing the end face of workpiece 400. Tool spindle 121 is therefore held in a posture in which spindle end face 123 is oriented laterally. In the present embodiment, the length of a portion of additive manufacturing head 21 that protrudes from spindle end face 123 of tool spindle 121 is short, and accordingly, maximum length L of a workpiece that can be subjected to additive manufacturing can be set larger.

Subsequently, a storage structure for additive manufacturing head 21 in FIG. 1 is described.

FIG. 12 is a perspective view showing the manufacturing machine as seen in the direction indicated by an arrow XII in FIG. 1. Referring to FIGS. 1 and 12, manufacturing machine 100 further includes a head stocker 151, a laser tool stocker 171, and a laser tool exchanger 161.

Head stocker 151 stores additive manufacturing head 21 in an outside-of-machining-area 250. Head stocker 151 is disposed at a position adjacent to machining area 200 in the Z-axis direction. Head stocker 151 is disposed above second headstock 116. Additive manufacturing head 21 in the state in which laser tool 26 is separated (in the state of being made up of head body 22 and cable joint 23) is stored in head stocker 151.

Head stocker 151 includes a head support 152, a cover support 157, a lid 154 and a movement mechanism 153.

Head support 152 is configured to be able to support additive manufacturing head 21. In the present embodiment, head support 152 has a pedestal shape, and additive manufacturing head 21 is placed on head support 152.

Cover support 157 is configured to be able to support attachment cover 156. Cover support 157 is disposed at a position adjacent to head support 152 in the Y-axis direction. Cover support 157 is integrated with head support 152.

Lid 154 is provided as a cover for covering head support 152 during additive manufacturing. Lid 154 has a shape of a flat plate. Lid 154 is provided to be swingable about a central axis 207 extending in parallel with the Z axis. As lid 154 swings about central axis 207, lid 154 switches between a first state of covering head support 152 from above and a second state of having been withdrawn from head support 152.

Movement mechanism 153 moves head support 152 and cover support 157 between machining area 200 and outside-of-machining-area 250. Movement mechanism 153 is made up of elements such as a guide mechanism (not shown) configured to guide head support 152 and cover support 157, and an actuator configured to move head support 152 and cover support 157. The type of the actuator is not particularly limited. In the present embodiment, an air cylinder is used as the actuator. More specifically, a piston rod of the air cylinder is connected to head support 152 and cover support 157. As the piston rod extends and contracts in the Z-axis direction, head support 152 and cover support 157 reciprocate between machining area 200 and outside-of-machining-area 250.

Laser tool stocker 171 is disposed in outside-of-machining-area 250, and stores a plurality of laser tools 26 (laser tool 26A, laser tool 26B, and laser tool 26C in the example shown in FIG. 6) that are different from each other in terms of the region to be irradiated with a laser beam defined on a workpiece. Laser tool exchanger 161 causes laser tools 26 to be exchanged between head body 22 (additive manufacturing head 21 attached to tool spindle 121) and laser tool stocker 171.

Laser tool stocker 171 and laser tool exchanger 161 are disposed in outside-of-machining-area 250. Laser tool stocker 171 and laser tool exchanger 161 are located further away from head stocker 151 in the Z-axis direction, as seen from machining area 200.

Laser tool stocker 171 includes a laser tool support 172. Laser tool support 172 is configured to be able to support a plurality of laser tools 26.

In the present embodiment, laser tool support 172 has a ring shape centered at a central axis 208 extending in parallel with the Z axis, and is provided to be swivelable about central axis 208. At intervals in the direction of the circumference centered at central axis 208, laser tool holders are attached for holding laser tools 26. The number of the laser tool holders is not particularly limited. In the present embodiment, the number of the laser tool holders is five. As laser tool support 172 swivels about central axis 208, laser tools 26 held by the laser tool holders move in the circumferential direction and a laser tool 26 to be used for additive manufacturing is placed at a predetermined position (hereinafter referred to as "laser tool indexing position").

In the present embodiment, the laser tool indexing position is located at the top of laser tool support 172 having a ring shape. As seem in the Z-axis direction, head stocker 151 is disposed at a position that does not overlap the laser tool indexing position.

Laser tool exchanger 161 includes a movement mechanism 163. Movement mechanism 163 moves laser tool 26 between machining area 200 and outside-of-machining-area 250. Movement mechanism 163 is made up of elements such as a guide mechanism (not shown) configured to guide laser tool 26, and an actuator configured to move laser tool 26. The type of the actuator is not particularly limited. In the present embodiment, an air cylinder is used as the actuator.

More specifically, a piston rod of the air cylinder is connected to laser tool 26 placed at the laser tool indexing position of laser tool support 172. As the piston rod extends and contracts in the Z-axis direction, laser tool 26 reciprocates between machining area 200 and outside-of-machining-area 250.

Manufacturing machine 100 further includes a head stocker cover (first cover) 141 and a laser tool stocker cover (second cover) 143.

Head stocker cover 141 is provided to separate machining area 200 and outside-of-machining-area 250 from each other. Head stocker cover 141 forms a part of splashguard 210 that defines machining area 200. Laser tool stocker cover 143 is provided to cover a plurality of laser tools 26 stored in laser tool stocker 171. Laser tool stocker cover 143 is provided to separate a space in which head stocker 151 is located and a space in which laser tool stocker 171 is located from each other in outside-of-machining-area 250.

Head stocker cover 141 includes a head stocker door (first open-close member) 142. As head stocker door 142 is set into a closed state, machining area 200 and outside-of-machining-area 250 are separated from each other. As head stocker door 142 is set into an open state, machining area 200 and outside-of-machining-area 250 communicate with each other. The open state of head stocker door 142 allows additive manufacturing head 21 to be moved between machining area 200 and outside-of-machining-area 250. The form of head stocker door 142 is not particularly limited. In the present embodiment, head stocker door 142 is provided in the form of an accordion door.

Laser tool stocker cover 143 includes a laser tool stocker door (second open-close member) 144. As laser tool stocker door 144 is set into a closed state, the space in which head stocker 151 is located and the space in which laser tool stocker 171 is located are separated from each other. As laser tool stocker door 144 is set into an open state, the space in which head stocker 151 is located and the space in which laser tool stocker 171 is located communicate with each other. The open state of head stocker door 142 and the open state of laser tool stocker door 144 allow laser tool 26 to move between machining area 200 and outside-of-machining-area 250. The form of laser tool stocker door 144 is not particularly limited. In the present embodiment, laser tool stocker door 144 is provided in the form of a shutter that slides in a single direction.

Subsequently, a flow of an exchange of laser tools 26 for additive manufacturing is described. FIGS. 13 to 17 are each a diagram schematically showing a step of a laser tool exchange for additive manufacturing.

Figure 13:
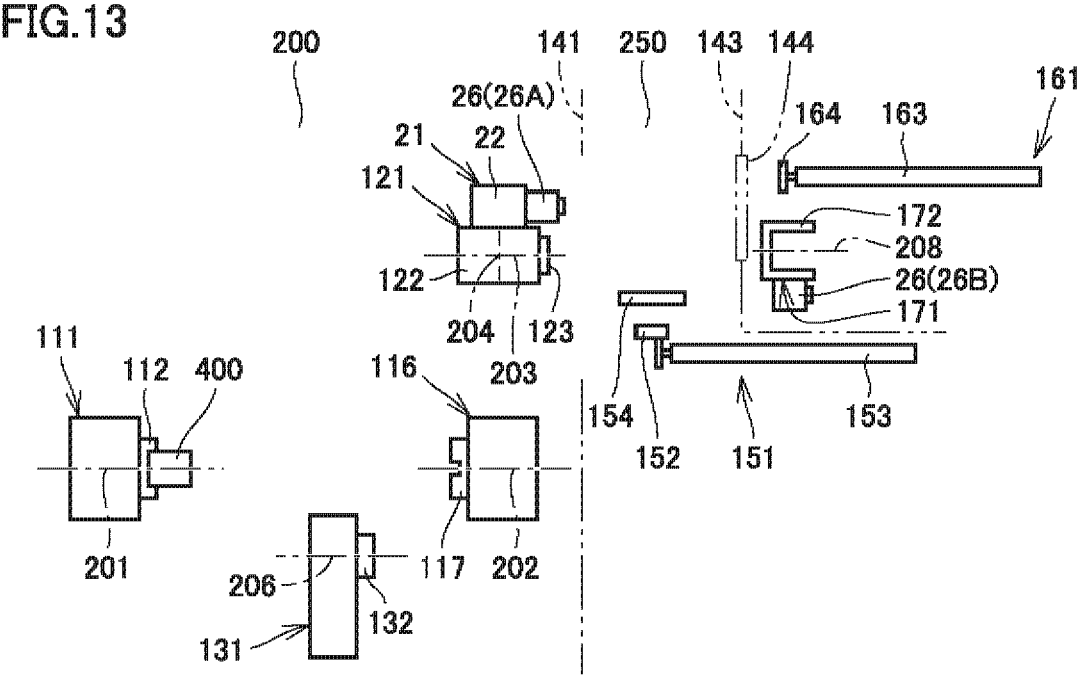
FIG. 13 is a diagram schematically showing a first step of a laser tool exchange for additive manufacturing.

Referring to FIG. 13, in machining area 200, laser tool 26A is attached to additive manufacturing head 21 that is attached to tool spindle 121. During additive manufacturing, laser tool stocker door 144 is in the closed state. Meanwhile, head stocker door 142 is in the open state because cable 24 provided for introducing material powder and a laser beam extends across machining area 200 and outside-of-machining-area 250. Before an exchange of laser tools 26, the laser tool indexing position on laser tool support 172 is an empty space.

First, in machining area 200, tool spindle 121 is moved to a position (hereinafter referred to as "laser tool exchange position") adjacent to head stocker door 142. At this time, tool spindle 121 is swiveled about central axis 204 so that spindle end face 123 is oriented laterally.

Figure 14:
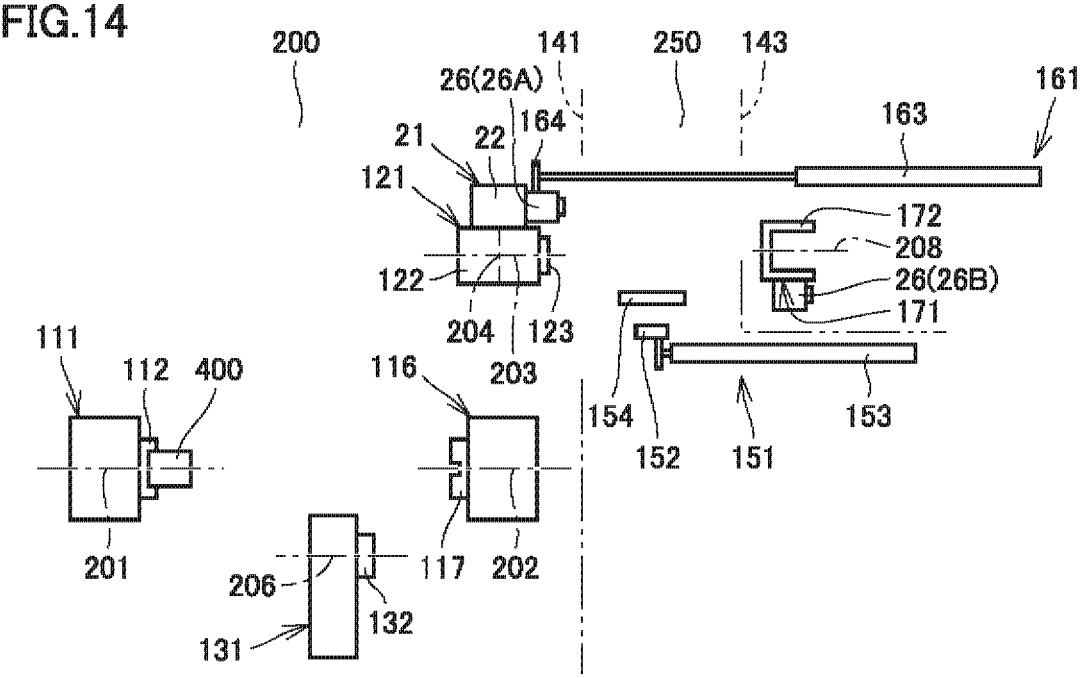
FIG. 14 is a diagram schematically showing a second step of the laser tool exchange for additive manufacturing.

Referring to FIG. 14, laser tool stocker door 144 is set into the open state. Movement mechanism 163 is activated to cause the piston rod of movement mechanism 163 to enter machining area 200 from outside-of-machining-area 250. The piston rod of movement mechanism 163 is coupled to laser tool 26A attached to additive manufacturing head 21 and laser tool 26A is unclamped from additive manufacturing head 21.

Referring to FIG. 15, movement mechanism 163 is activated to return the piston rod of movement mechanism 163 from machining area 200 into outside-of-machining-area 250. At laser tool support 172, laser tool 26A is held at the laser tool indexing position.

Referring to FIG. 16, laser tool support 172 is swiveled about central axis 208 to place laser tool 26B at the laser tool indexing position. At this time, the piston rod of movement mechanism 163 is coupled to laser tool 26B.

Figure 17:
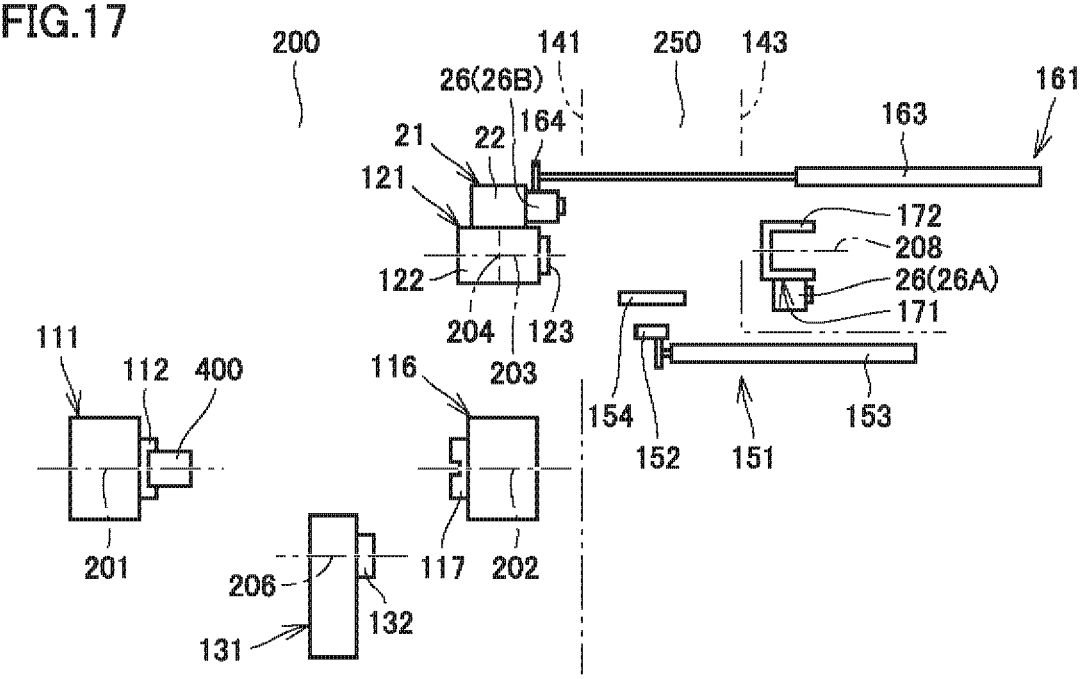
FIG. 17 is a diagram schematically showing a fifth step of the laser tool exchange for additive manufacturing.

Referring to FIG. 17, movement mechanism 163 is activated to cause the piston rod of movement mechanism 163 to enter machining area 200 from outside-of-machining-area 250. Accordingly, laser tool 26B is moved from laser tool support 172 to additive manufacturing head 21. Laser tool 26B is clamped at additive manufacturing head 21.

Movement mechanism 163 is thereafter activated to return the piston rod of movement mechanism 163 from machining area 200 into outside-of-machining-area 250. Laser tool stocker door 144 is set into the closed state. Through the above-described steps, the exchange of laser tools 26 is completed.

In the present embodiment, laser tool exchanger 161 can be used to speedily exchange a laser tool 26 attached to additive manufacturing head 21 for a laser tool 26 appropriate for additive manufacturing to be performed. In this way, the productivity of additive manufacturing can be improved.

During additive manufacturing, head stocker door 142 is in the open state. Material powder flying in machining area 200 due to additive manufacturing thus enters outside-of-machining-area 250. In the present embodiment, laser tool stocker cover 143 with closed laser tool stocker door 144 can prevent the material powder from attaching to laser tools 26 stored at laser tool stocker 171. During subtractive manufacturing as well, a double-cover structure made up of head stocker cover 141 and laser tool stocker cover 143 can more reliably prevent coolant and/or mist and/or chips generated during subtractive manufacturing from entering laser tool stocker 171.

In order to still more reliably prevent foreign matter from entering the inside of laser tool stocker cover 143, the pressure inside laser tool stocker cover 143 may be increased by an air purge.

Subsequently, a flow of an attachment of additive manufacturing head 21 for transition from subtractive manufacturing to additive manufacturing is described.

FIGS. 18 to 24 are each a diagram schematically showing a step of an attachment of an additive manufacturing head for transition from subtractive manufacturing to additive manufacturing.

Figure 18:
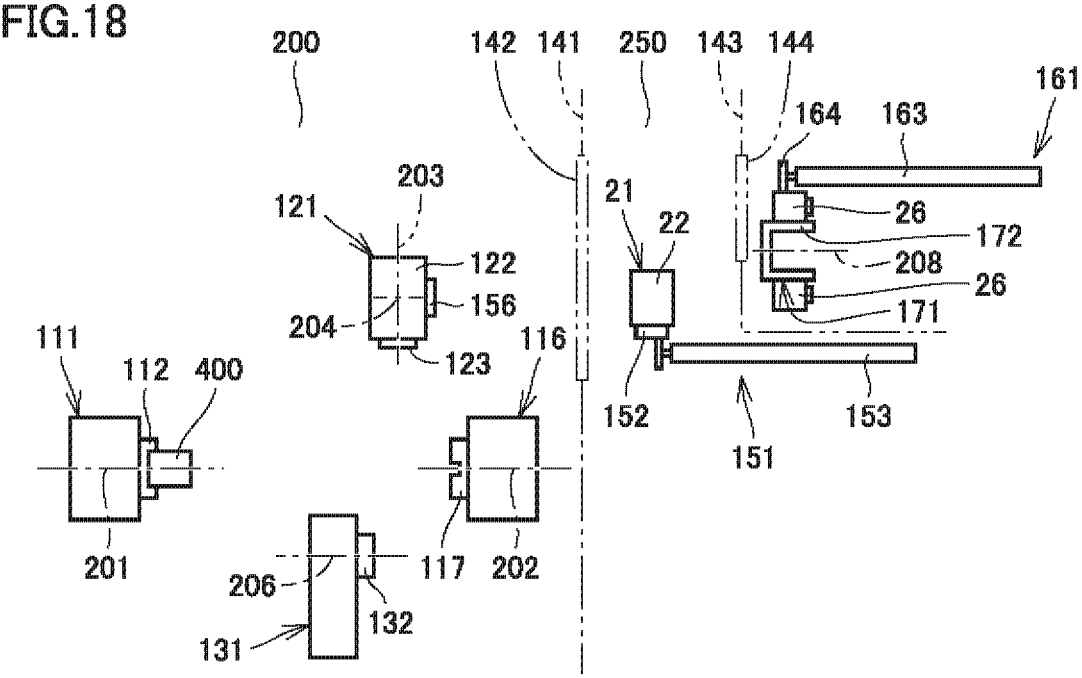
FIG. 18 is a diagram schematically showing a first step of an attachment of an additive manufacturing head for transition from subtractive manufacturing to additive manufacturing.

Referring to FIG. 18, during subtractive manufacturing, head stocker door 142 and laser tool stocker door 144 are in the closed state. In machining area 200, a workpiece 400 having undergone subtractive manufacturing is mounted on first headstock 111. In outside-of-machining-area 250, head stocker 151 stores additive manufacturing head 21. At laser tool stocker 171, laser tool 26 to be used for the following additive manufacturing is placed at the laser tool indexing position.

Initially, in machining area 200, tool spindle 121 is moved to a position adjacent to head stocker door 142. At this time, tool spindle 121 is set in the posture in which spindle end face 123 is oriented downward.

Referring to FIG. 19, head stocker door 142 is set into the open state to allow machining area 200 and outside-of-machining-area 250 to communicate with each other. Movement mechanism 153 is activated to move head support 152 and cover support 157 from outside-of-machining-area 250 into machining area 200. Cover support 157 is moved to approach tool spindle 121 and thereby transfer attachment cover 156 mounted on tool spindle 121 to cover support 157 (not shown).

Referring to FIG. 20, tool spindle 121 is moved to approach additive manufacturing head 21 supported by head support 152 and additive manufacturing head 21 is clamped at tool spindle 121. In this way, additive manufacturing head 21 is attached to tool spindle 121.

Referring to FIG. 21, movement mechanism 153 is activated to move head support 152 and cover support 157 from machining area 200 into outside-of-machining-area 250. Lid 154 is caused to swing about central axis 207 so as to change from the second state of having been withdrawn from head support 152 to the first state of supporting head support 152. Thus, material powder for additive manufacturing can be prevented from attaching to head support 152.

Referring to FIG. 22, tool spindle 121 is caused to swivel by 90° about central axis 204, and moved to the laser tool exchange position. At this time, tool spindle 121 is set in the posture in which spindle end face 123 is oriented laterally.

Figure 23:
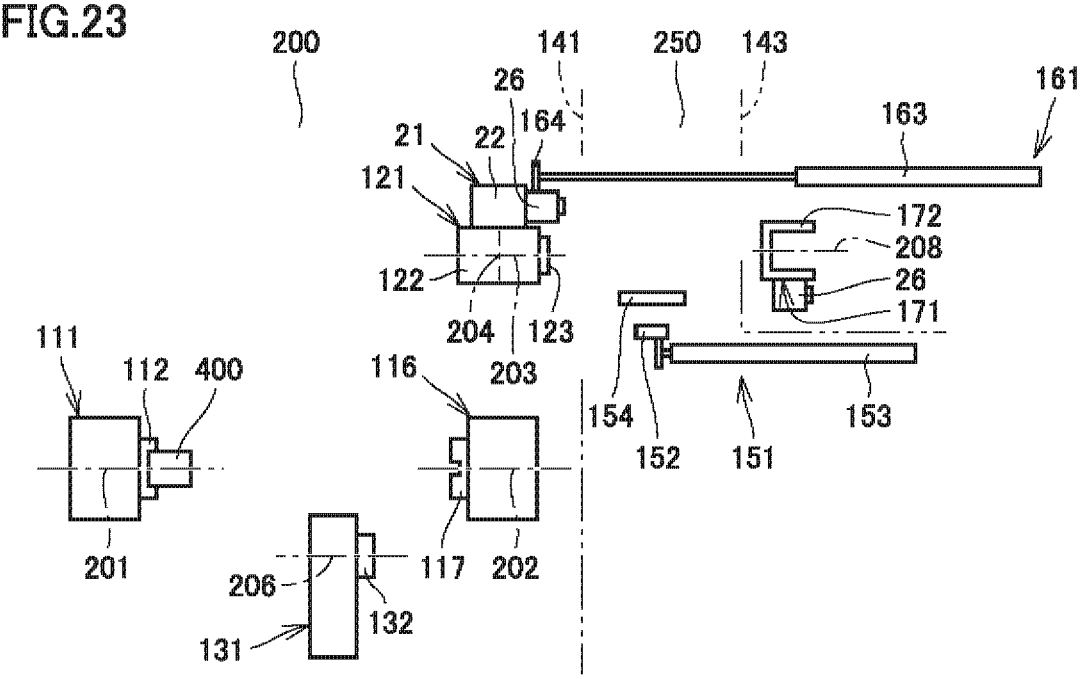
FIG. 23 is a diagram schematically showing a sixth step of the attachment of the additive manufacturing head for transition from subtractive manufacturing to additive manufacturing.

Referring to FIG. 23, laser tool stocker door 144 is set into the open state. Movement mechanism 163 is activated to move laser tool 26 at the laser tool exchange position from outside-of-machining-area 250 into machining area 200. Laser tool 26 is then attached to additive manufacturing head 21 that is attached to tool spindle 121.

Figure 24:
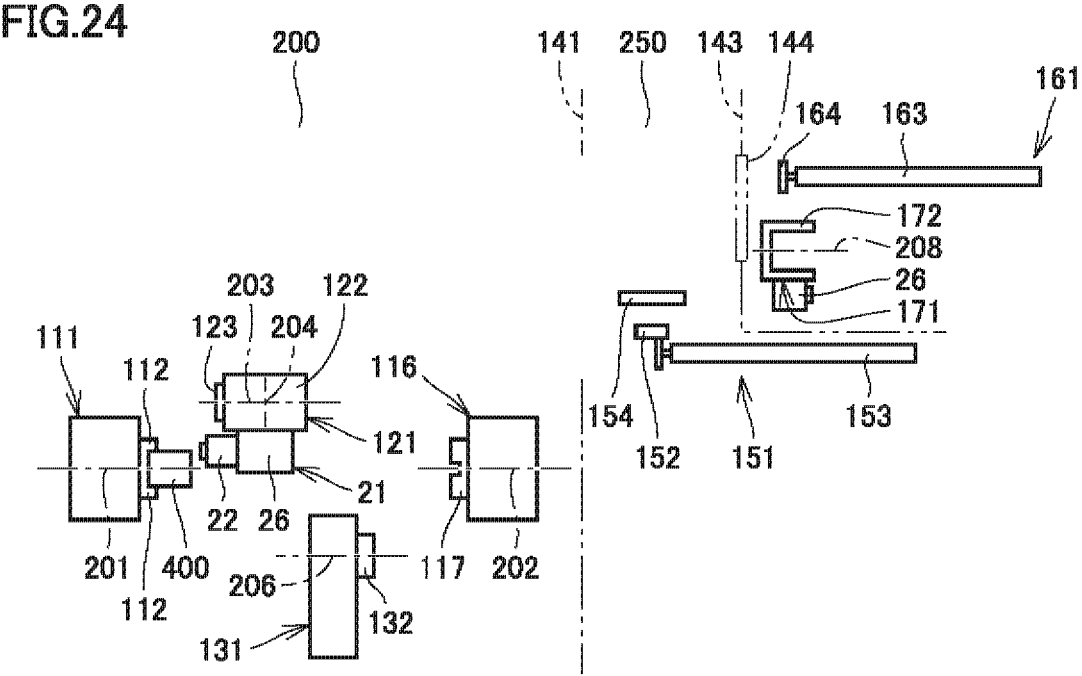
FIG. 24 is a diagram schematically showing a seventh step of the attachment of the additive manufacturing head for transition from subtractive manufacturing to additive manufacturing.

Referring to FIG. 24, movement mechanism 163 is activated to return the piston rod of movement mechanism 163 from machining area 200 into outside-of-machining-area 250. Laser tool stocker door 144 is set into the closed state. Additive manufacturing head 21 is moved to approach workpiece 400 to start additive manufacturing.

A basic structure of above-described manufacturing machine 100 in the embodiment of the present invention is described. Manufacturing machine 100 in the present embodiment is capable of subtractive manufacturing and additive manufacturing for a workpiece. Manufacturing machine 100 includes: tool spindle 121 disposed movably in machining area 200 and serving as a tool holder configured to hold a tool for subtractive manufacturing for a workpiece; additive manufacturing head 21 configured to be detachably mounted on tool spindle 121 and to discharge material powder and emit a laser beam as an energy beam during additive manufacturing for a workpiece; and head stocker 151 configured to store additive manufacturing head 21 in outside-of-machining-area 250. Additive manufacturing head 21 includes: head body 22 serving as a body into which a laser beam is introduced; and laser tool 26 configured to be detachably mounted on head body 22 and serving as an emission part configured to emit a laser beam and define a laser-beam-irradiated region on a workpiece. Manufacturing machine 100 further includes: laser tool stocker 171 disposed in outside-of-machining-area 250 and serving as an emission part stocker configured to store a plurality of laser tools 26 that are different from each other in terms of a laser-beam-irradiated region defined on a workpiece; and laser tool exchanger 161 serving as an emission part exchanger configured to exchange laser tools 26 between head body 22 and laser tool stocker 171.

While the above description regarding the present embodiment is of the AM/SM hybrid manufacturing machine configured on the basis of a multi-functional manufacturing machine having both a turning function and a milling function, the configuration is not limited to this. An AM/SM hybrid manufacturing machine may be configured based on a machining center having the milling function, for example.

A manufacturing machine according to the present invention is capable of subtractive manufacturing and additive manufacturing for a workpiece. The manufacturing machine includes: a tool holder disposed movably in a machining area and configured to hold a tool to be used for subtractive manufacturing for a workpiece; an additive manufacturing head configured to be detachably mounted on the tool holder and to discharge material powder and emit an energy beam during additive manufacturing for a workpiece; and a head stocker configured to store the additive manufacturing head in an outside of the machining area. The additive manufacturing head includes: a body into which an energy beam is to be introduced; and an emission part configured to be detachably mounted on the body and to emit the energy beam and define an energy-beam-irradiated region that is a region irradiated with the energy beam on the workpiece. The manufacturing machine further includes: an emission part stocker disposed in the outside of the machining area and configured to store a plurality of the emission parts that are different from each other in terms of the energy-beam-irradiated region defined on a workpiece; and an emission part exchanger configured to cause the emission parts to be exchanged between the body and the emission part stocker.

In the manufacturing machine configured in this way, the emission part exchanger causes emission parts to be exchanged between the body and the emission part stocker. Thus, an emission part appropriate for additive manufacturing to be performed can be mounted on the additive manufacturing head. Accordingly, the productivity of additive manufacturing can be improved.

Preferably, the tool holder is configured to be swivelable about a predetermined axis. A direction in which the emission part emits the energy beam is changed as the tool holder swivels.

In the manufacturing machine configured in this way, the direction in which the energy beam is emitted toward the workpiece can be changed freely.

Preferably, when the emission parts are to be exchanged by the emission part exchanger, the tool holder is swiveled to position the additive manufacturing head in a posture that enables the emission parts to be exchanged between the body and the emission part stocker.

In the manufacturing machine configured in this way, the posture of the additive manufacturing head when emission parts are to be exchanged can be set freely. Thus, the degree of freedom in designing the emission part exchanger can be improved.

Preferably, the tool holder is a tool spindle configured to rotate a tool. The tool spindle includes a cylindrical portion extending in a cylindrical shape along a rotational axis of the tool. The additive manufacturing head is detachably mounted on the cylindrical portion.

In the manufacturing machine configured in this way, the length of a portion of the additive manufacturing head that protrudes from the tool holder in the direction of the rotational axis of the tool can be shortened, as compared with an additive manufacturing head mounted on an extension of the rotational axis of the tool. Accordingly, interference between the workpiece and the additive manufacturing head is avoided to enable a larger workpiece to be subjected to additive manufacturing.

Preferably, the manufacturing machine further includes: a first cover including a first open-close member configured to be openable and closable, the first cover being configured to separate an inside and the outside of the machining area from each other; and a second cover including a second open-close member configured to be openable and closable, the second cover being configured to cover a plurality of the emission parts stored at the emission part stocker in the outside of the machining area.

In the manufacturing machine configured in this way, a plurality of emission parts stored at the emission part stocker can be covered by the second cover even when the first open-close member of the first cover is in the open state. Accordingly, the emission parts can be prevented from being exposed to the ambient in the machining area.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is mainly applied to AM/SM hybrid manufacturing machines capable of subtractive manufacturing and additive manufacturing for a workpiece.

REFERENCE SIGNS LIST 21 additive manufacturing head; 22 head body; 23 cable joint; 24 cable; 26, 26A, 26B, 26C laser tool (emission part); 31 servo motor; 32, 33 clutch plate; 34 rotary shaft; 35 pulley belt; 41 optical fiber; 42 laser beam inlet tube; 43, 45, 48 laser beam passage casing; 44 laser beam passage tube; 46, 47 connecting part; 49 laser beam emission casing; 51, 52 coupling part; 61 collimation lens; 62, 63 reflection mirror; 64, 65, 67 protective glass; 66, 66A, 66B, 66C condenser lens; 68 homogenizer; 70 material powder feeder; 71 mixing unit; 72 material powder tank; 76 laser oscillator; 78 nozzle; 78j discharge outlet; 81 stationary member; 86 rotary member; 87 pipe joint; 100 manufacturing machine; 111 first headstock; 112 first spindle; 116 second headstock; 117 second spindle; 121 tool spindle; 122 cylindrical portion; 123 spindle end face; 131 lower tool rest; 132 swivel unit; 136 bed; 141 head stocker cover; 142 head stocker door; 143 laser tool stocker cover; 144 laser tool stocker door; 151 head stocker; 152 head support; 153, 163 movement mechanism; 154 lid; 156 attachment cover; 157 cover support; 161 laser tool exchanger; 171 laser tool stocker (emission part stocker); 172 laser tool support; 200 machining area; 201, 202, 203, 204, 206, 207, 208, 221 central axis; 210 splashguard; 250 outside-of-machining-area; 311 laser beam; 312 material powder; 313 gas; 314 melt spot; 315 cladding material; 316 cladding layer; 400 workpiece

The invention claimed is:

1. A manufacturing machine capable of subtractive manufacturing and additive manufacturing for a workpiece, the manufacturing machine comprising:
a tool holder disposed movably in a machining area and configured to hold a tool to be used for subtractive manufacturing from a workpiece;
an additive manufacturing head configured to be detachably mounted on the tool holder and to discharge material powder and emit an energy beam during additive manufacturing for a workpiece;
a head stocker positioned adjacent to the machining area and configured to extend into the machining area, wherein the head stocker is configured to move the additive manufacturing head between the machining area and an outside of the machining area to store the additive manufacturing head on the head stocker outside of the machining area,
the additive manufacturing head including
a body into which an energy beam is to be introduced, and
an emission part configured to be detachably mounted on the body and to emit the energy beam and define an energy-beam-irradiated region that is a region irradiated with the energy beam on the workpiece;
an emission part stocker disposed on the outside of the machining area and configured to store a plurality of the emission parts that are different from each other in terms of the energy-beam-irradiated region defined on a workpiece; and
an emission part exchanger that is separate from the head stocker and configured to move the emission parts from outside of the machining area into the machining area to be exchanged between the body and the emission part stocker.

2. The manufacturing machine according to claim 1, wherein
the tool holder is configured to be swivelable about a predetermined axis, and
a direction in which the emission part emits the energy beam is changed as the tool holder swivels.

3. The manufacturing machine according to claim 2, wherein
when the emission parts are to be exchanged by the emission part exchanger, the tool holder is swiveled to position the additive manufacturing head in a posture that enables the emission parts to be exchanged between the body and the emission part stocker.

4. The manufacturing machine according to claim 1, wherein
the tool holder is a tool spindle configured to rotate a tool, the tool spindle includes a cylindrical portion extending in a cylindrical shape along a rotational axis of the tool, and
the additive manufacturing head is detachably mounted on the cylindrical portion.

5. The manufacturing machine according to claim 1, further comprising:
a first cover positioned within the manufacturing machine and including a first open-close member configured to be openable and closable, the first cover being configured to separate an inside from the outside of the machining area from one another; and
a second cover positioned within the manufacturing machine and including a second open-close member configured to be openable and closable, the second cover being configured to cover a plurality of the emission parts stored at the emission part stocker on the outside of the machining area.

6. The manufacturing machine according to claim 5, wherein the head stocker is positioned behind the first cover and the emission part stocker and the emission part exchanger are positioned behind the second cover.

7. The manufacturing machine according to claim 6, wherein the emission part exchanger is configured to pass through the first cover and the second cover to move the emission parts from the outside of the machining area into the machining area.

8. The manufacturing machine according to claim 1, wherein the head stocker includes a head support configured to support the additive manufacturing head and a movement mechanism configured to move the head support from the outside of the machining area into the machining area.

9. The manufacturing machine according to claim 1, wherein the emission part exchanger is configured to move the emissions parts from the outside of the machining area into the machining area.

10. A manufacturing machine capable of subtractive manufacturing and additive manufacturing for a workpiece, the manufacturing machine comprising:
a tool holder disposed movably in a machining area and configured to hold a tool to be used for subtractive manufacturing from a workpiece;
an additive manufacturing head configured to be detachably mounted on the tool holder and to discharge material powder and emit an energy beam during additive manufacturing for a workpiece;
a head stocker configured to store the additive manufacturing head on the outside of the machining area,
the additive manufacturing head including
a body into which an energy beam is to be introduced, and
an emission part configured to be detachably mounted on the body and to emit the energy beam and define an energy-beam-irradiated region that is a region irradiated with the energy beam on the workpiece;
an emission part stocker disposed on the outside of the machining area and configured to store a plurality of the emission parts that are different from each other in terms of the energy-beam-irradiated region defined on a workpiece; and
an emission part exchanger configured to cause the emission parts to be exchanged between the body and the emission part stocker, wherein
the tool holder is configured to be swivelable about a predetermined axis,
a direction in which the emission part emits the energy beam is changed as the tool holder swivels, and
when the emission parts are to be exchanged by the emission part exchanger, the tool holder is swiveled to position the additive manufacturing head in a posture that enables the emission parts to be exchanged between the body and the emission part stocker.

11. A manufacturing machine capable of subtractive manufacturing and additive manufacturing for a workpiece, the manufacturing machine comprising:
a tool holder disposed movably in a machining area and configured to hold a tool to be used for subtractive manufacturing from a workpiece;
an additive manufacturing head configured to be detachably mounted on the tool holder and to discharge material powder and emit an energy beam during additive manufacturing for a workpiece;
a head stocker configured to store the additive manufacturing head on the outside of the machining area,
the additive manufacturing head including
a body into which an energy beam is to be introduced, and
an emission part configured to be detachably mounted on the body and to emit the energy beam and define an energy-beam-irradiated region that is a region irradiated with the energy beam on the workpiece;
an emission part stocker disposed on the outside of the machining area and configured to store a plurality of the emission parts that are different from each other in terms of the energy-beam-irradiated region defined on a workpiece,
an emission part exchanger configured to cause the emission parts to be exchanged between the body and the emission part stocker,
a first cover including a first open-close member configured to be openable and closable, the first cover being configured to separate the inside from the outside of the machining area from one another; and
a second cover including a second open-close member configured to be openable and closable, the second cover being configured to cover a plurality of the emission parts stored at the emission part stocker on the outside of the machining area.

* * * * *